US012532299B2

United States Patent
Lee et al.

(10) Patent No.: US 12,532,299 B2
(45) Date of Patent: Jan. 20, 2026

(54) METHOD AND DEVICE FOR TRANSMITTING AUDIO DATA IN SHORT-RANGE WIRELESS COMMUNICATION SYSTEM

(71) Applicant: LG ELECTRONICS INC., Seoul (KR)

(72) Inventors: Hyeonjae Lee, Seoul (KR); Minsoo Lee, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 428 days.

(21) Appl. No.: 18/255,305

(22) PCT Filed: Dec. 1, 2021

(86) PCT No.: PCT/KR2021/018009
§ 371 (c)(1),
(2) Date: May 31, 2023

(87) PCT Pub. No.: WO2022/119312
PCT Pub. Date: Jun. 9, 2022

(65) Prior Publication Data
US 2024/0107503 A1    Mar. 28, 2024

(30) Foreign Application Priority Data
Dec. 1, 2020    (KR) .................. 10-2020-0165884

(51) Int. Cl.
*H04W 4/80*    (2018.01)
*G06F 3/16*    (2006.01)
(Continued)

(52) U.S. Cl.
CPC ........ *H04W 72/0446* (2013.01); *G06F 3/165* (2013.01); *H04W 84/18* (2013.01)

(58) Field of Classification Search
CPC ... H04W 72/0446; H04W 84/18; H04W 4/80; H04W 56/00; G06F 3/165; H04L 7/00;
(Continued)

(56) References Cited

U.S. PATENT DOCUMENTS 9,844,068 B2 * 12/2017 Trainin ............. H04W 72/0446
10,086,291 B1 * 10/2018 Wisler .................... G06F 16/40
(Continued)

FOREIGN PATENT DOCUMENTS

KR         10-0882356         2/2009
KR    10-2015-0130894        11/2015
(Continued)

OTHER PUBLICATIONS

PCT International Application No. PCT/KR2021/018009, International Search Report dated Feb. 28, 2022, 5 page.

*Primary Examiner* — Andrew Wendell
(74) *Attorney, Agent, or Firm* — LEE, HONG, DEGERMAN, KANG & WAIMEY

(57) ABSTRACT

A method of transmitting audio data in a short-range wireless communication system, and a device therefor are provided. More specifically, a method of transmitting, by a master device, audio data in a short-range wireless communication system comprises transmitting, to at least one first slave device, the audio data based on a broadcast scheme; and receiving, from at least one second slave device, data generated based on a user input based on a unicast scheme, wherein (i) a transmission of the audio data and (ii) a reception of the data generated based on the user input are performed based on at least one time duration periodically allocated for (i) the transmission of the audio data and (ii) the reception of the data generated based on the user input, and wherein each of the at least one time duration includes (i) a first time duration for the transmission of the audio data (Continued)

and (ii) a second time duration for the reception of the data generated based on the user input.

16 Claims, 21 Drawing Sheets

(51) Int. Cl.
*H04W 72/0446* (2023.01)
*H04W 84/18* (2009.01)

(58) Field of Classification Search
CPC ....... H04L 12/40; H04L 12/403; H04B 7/269; H04B 5/79; H04M 15/8077; H04M 3/53375
See application file for complete search history.

(56) References Cited

U.S. PATENT DOCUMENTS

| | | | |
|---|---|---|---|
| 2007/0242668 A1* | 10/2007 | Barrett | H04L 67/63 370/390 |
| 2016/0301755 A1* | 10/2016 | Lee | H04L 67/125 |
| 2018/0254954 A1* | 9/2018 | Kanaya | H04L 41/0886 |
| 2019/0082276 A1* | 3/2019 | Crow | H04R 25/505 |
| 2020/0228959 A1* | 7/2020 | Park | H04W 8/005 |
| 2021/0288764 A1* | 9/2021 | Linsky | H04L 65/611 |
| 2022/0321368 A1* | 10/2022 | Lee | H04L 12/1881 |

FOREIGN PATENT DOCUMENTS

| KR | 10-2017-0016883 | 2/2017 |
|---|---|---|
| KR | 10-2018-0117618 | 10/2018 |
| KR | 10-2020-0102046 | 8/2020 |

\* cited by examiner

[FIG. 1]
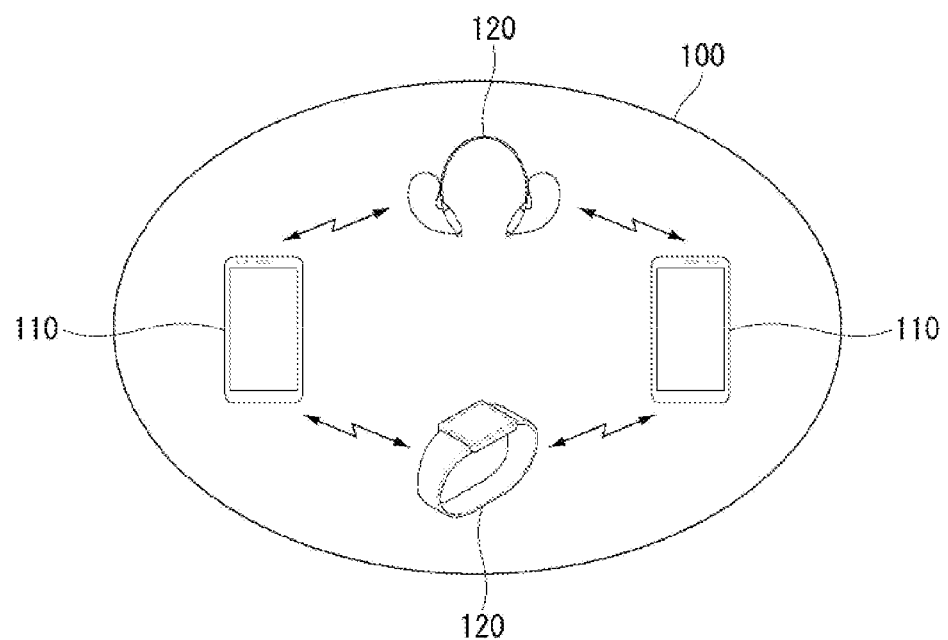

[FIG. 2]
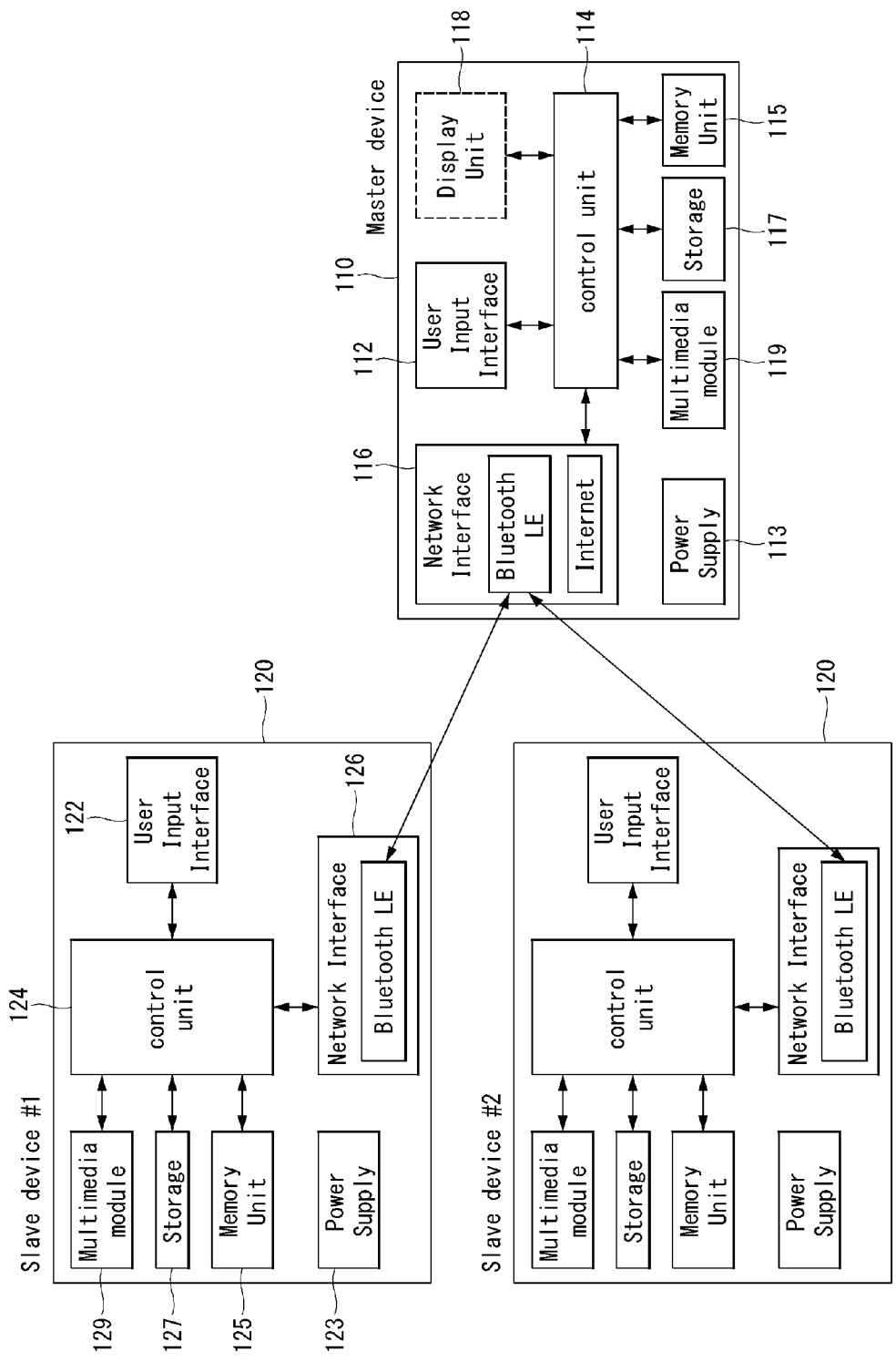

[FIG. 3]
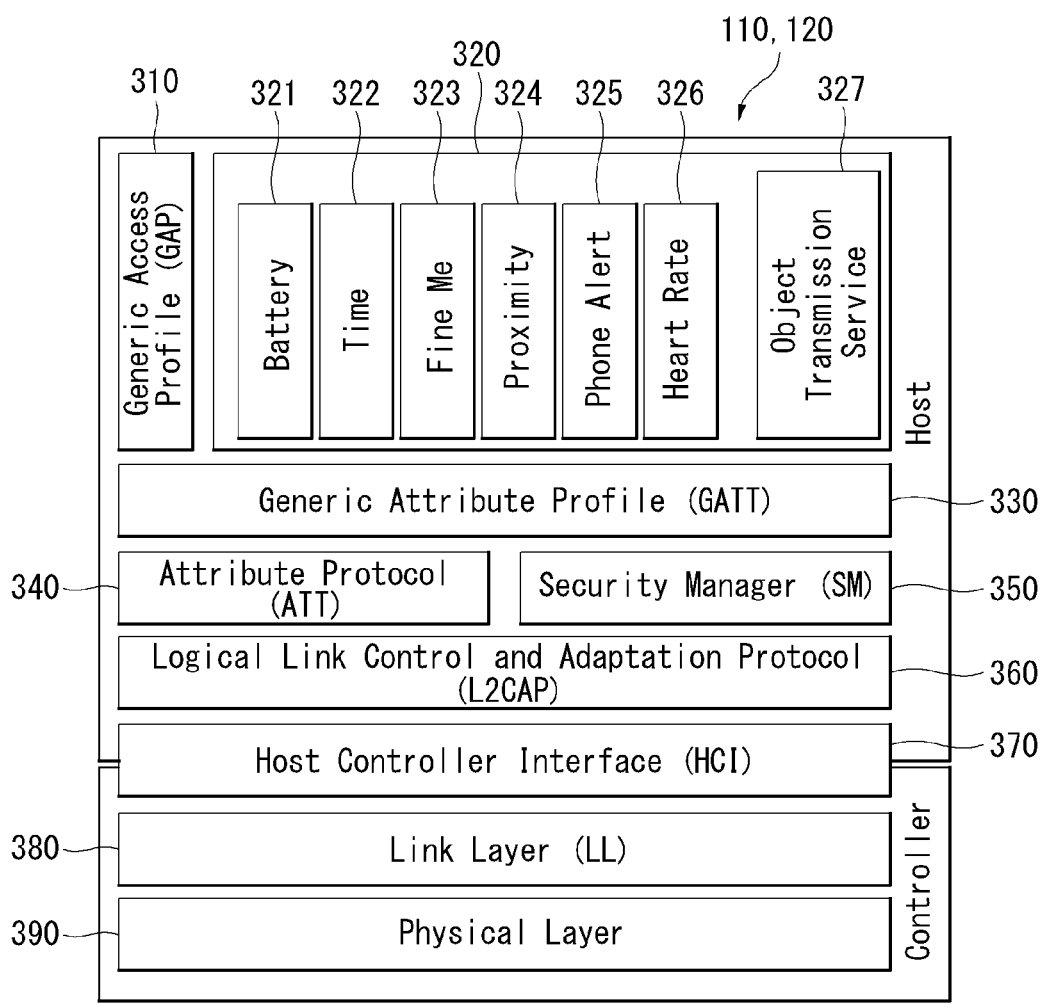

[FIG. 4]
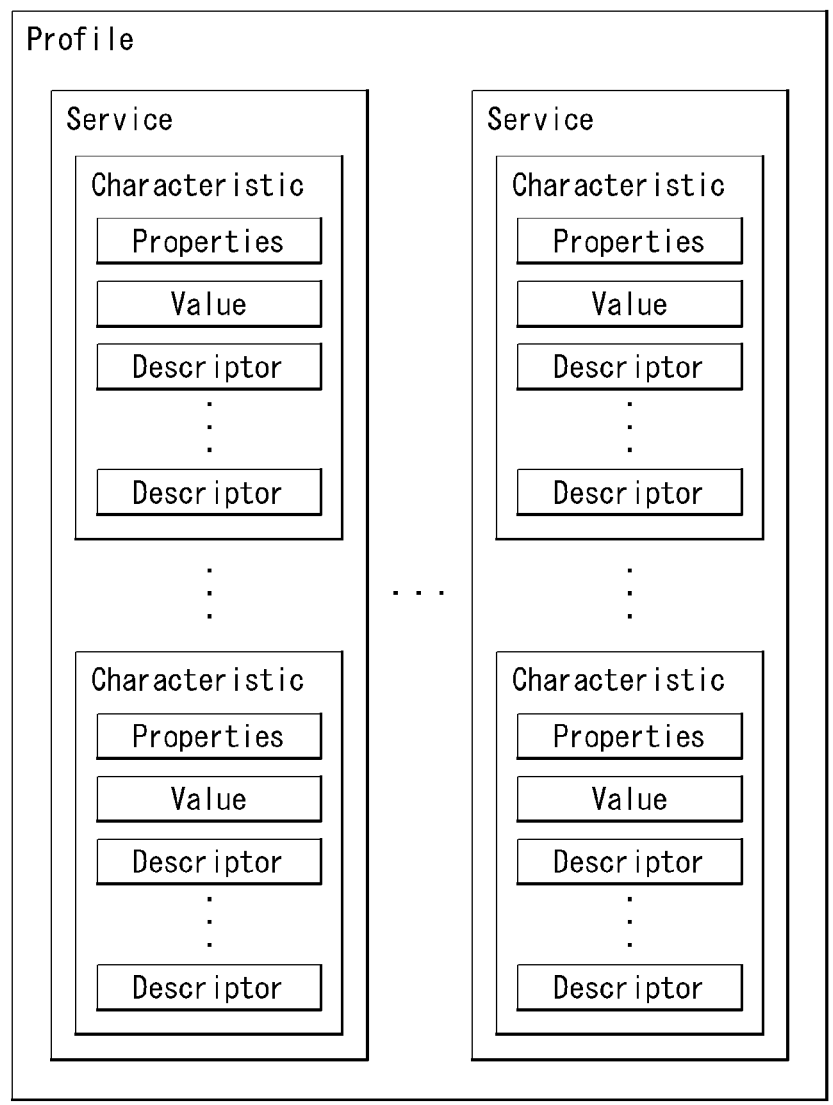

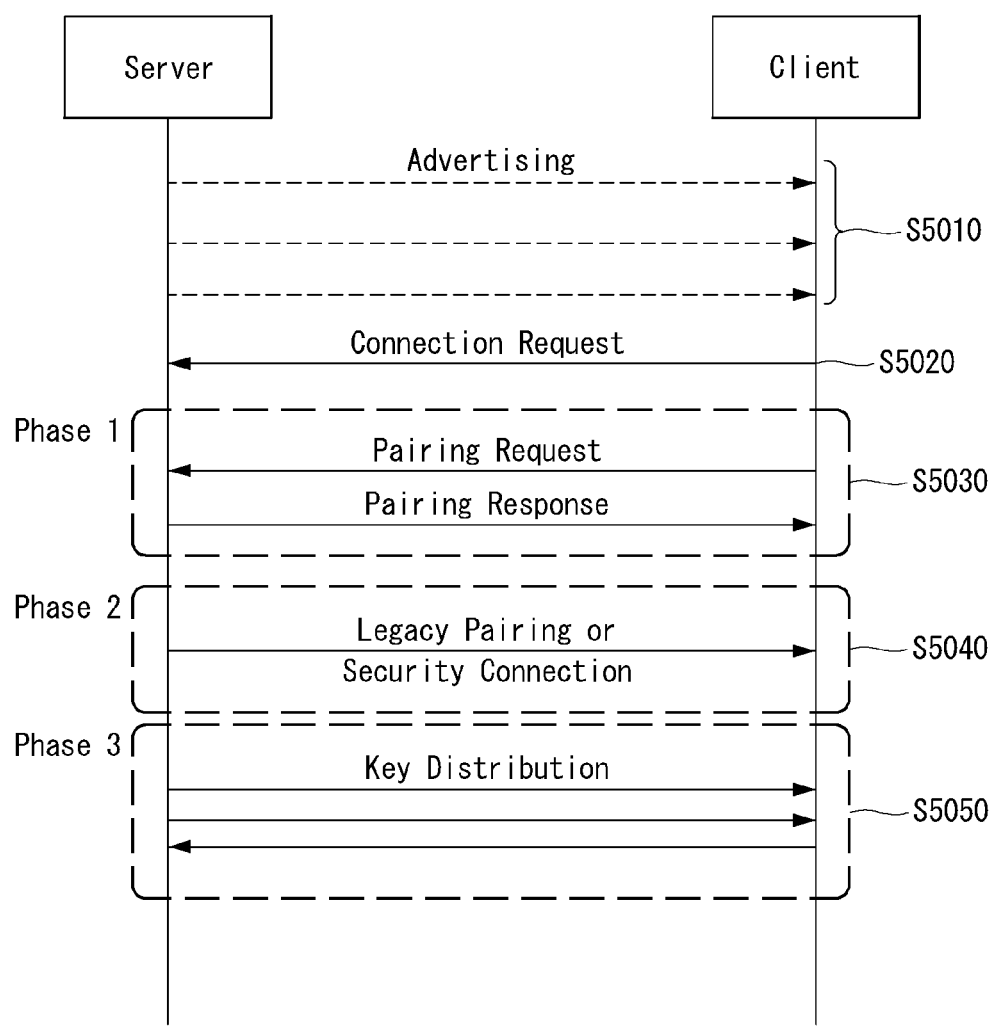

[FIG. 6]
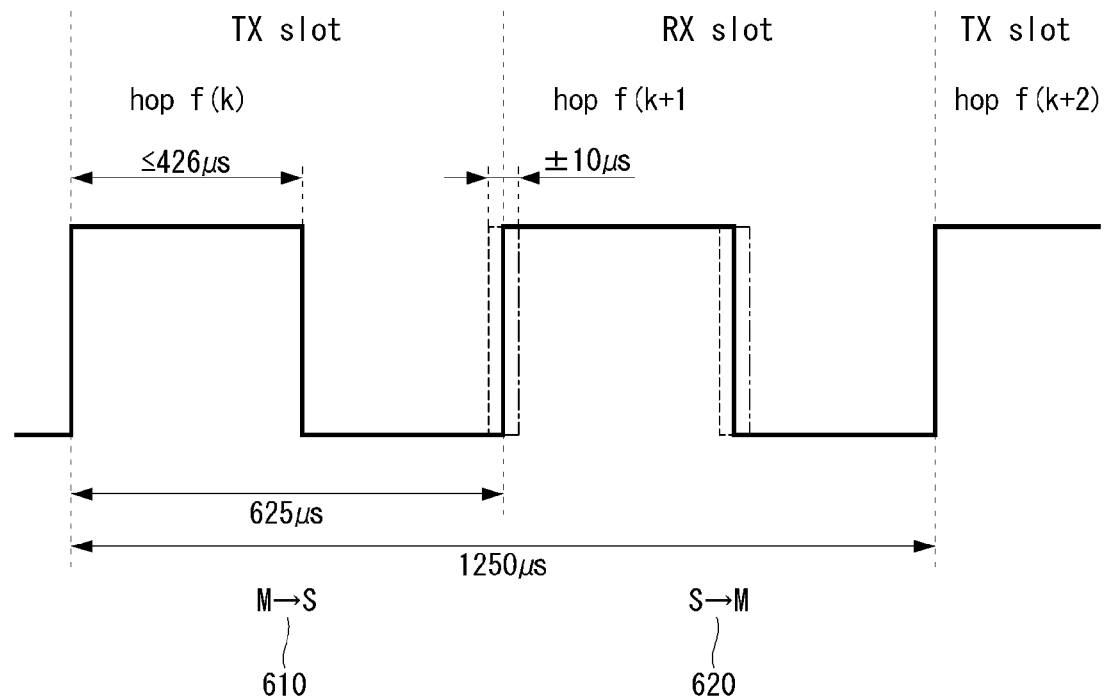
[FIG. 7]
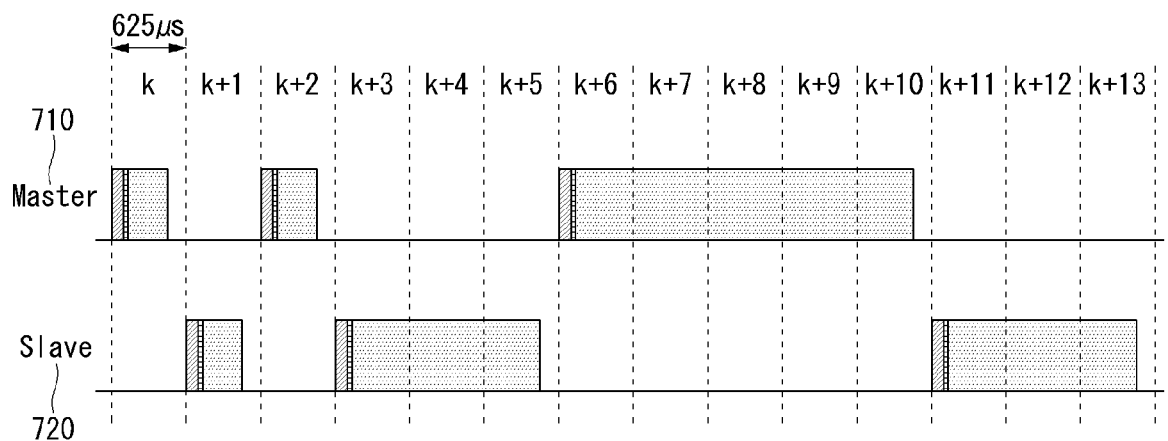

[FIG. 8]
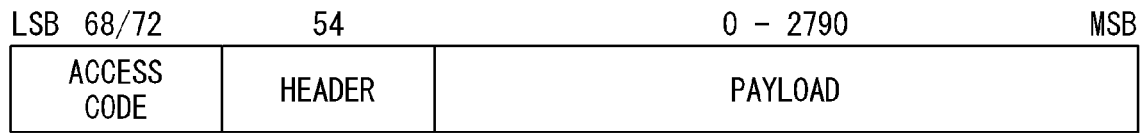
[FIG. 9]
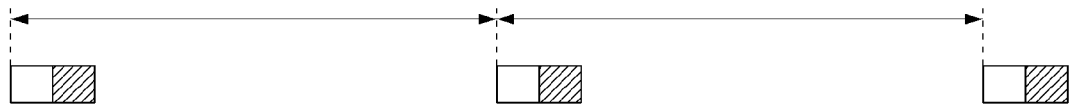
[FIG. 10]
[FIG. 11]
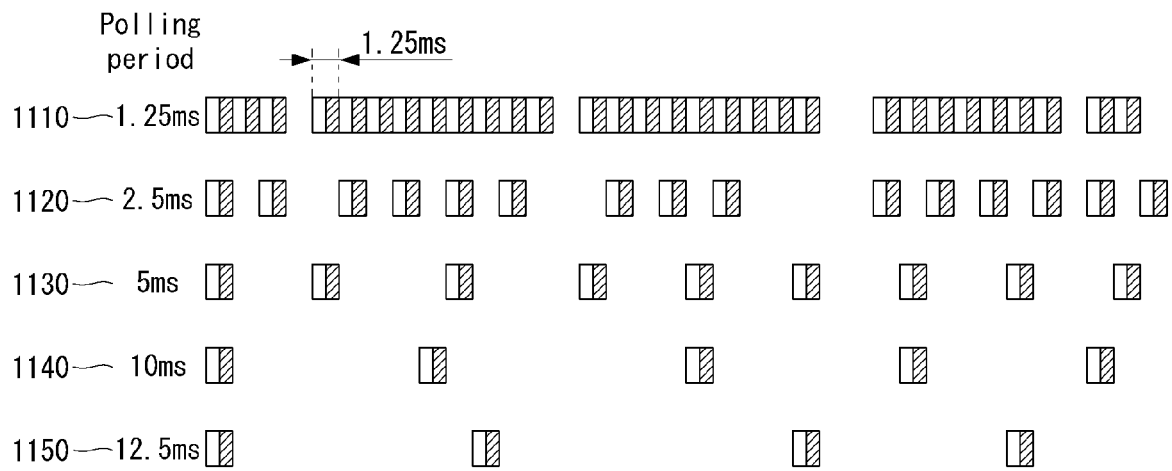

[FIG. 12]
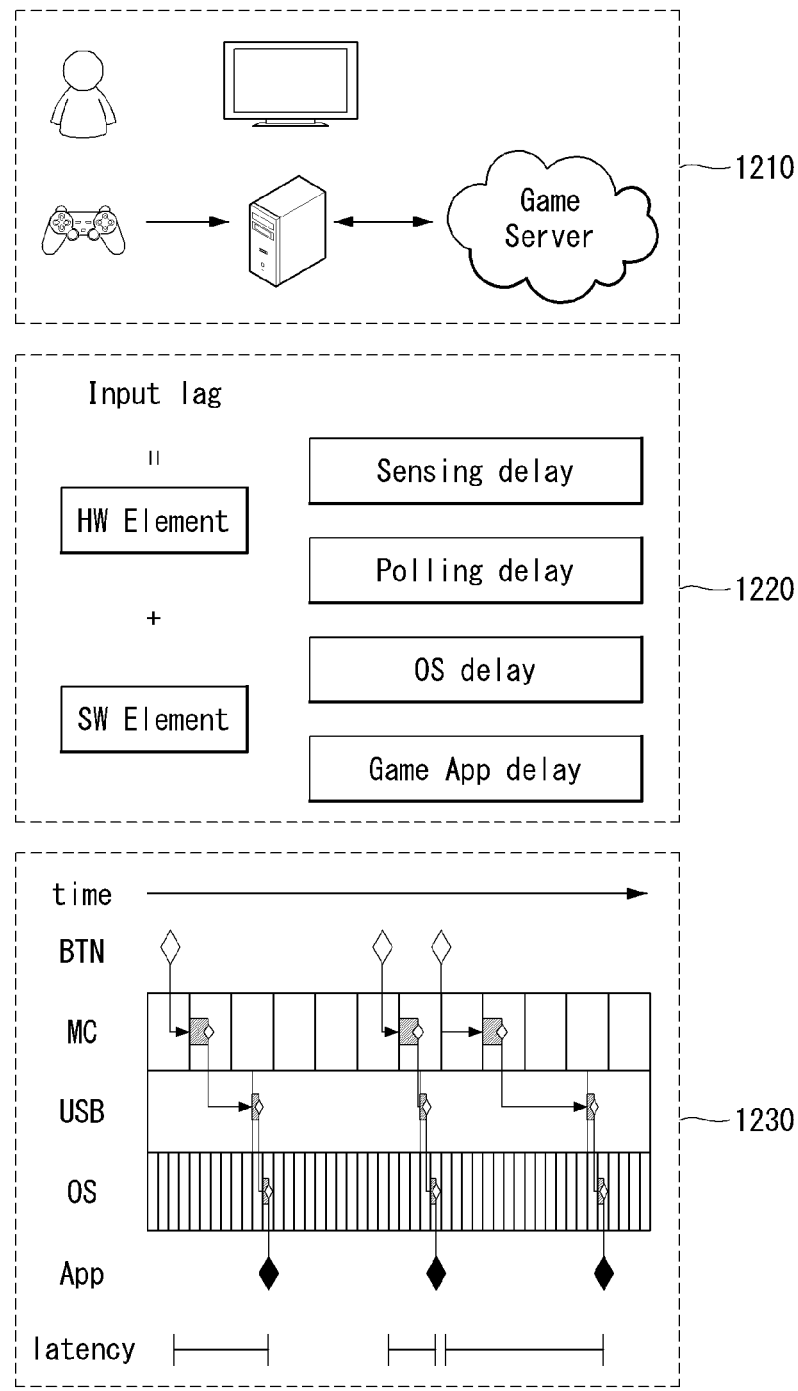

[FIG. 13]
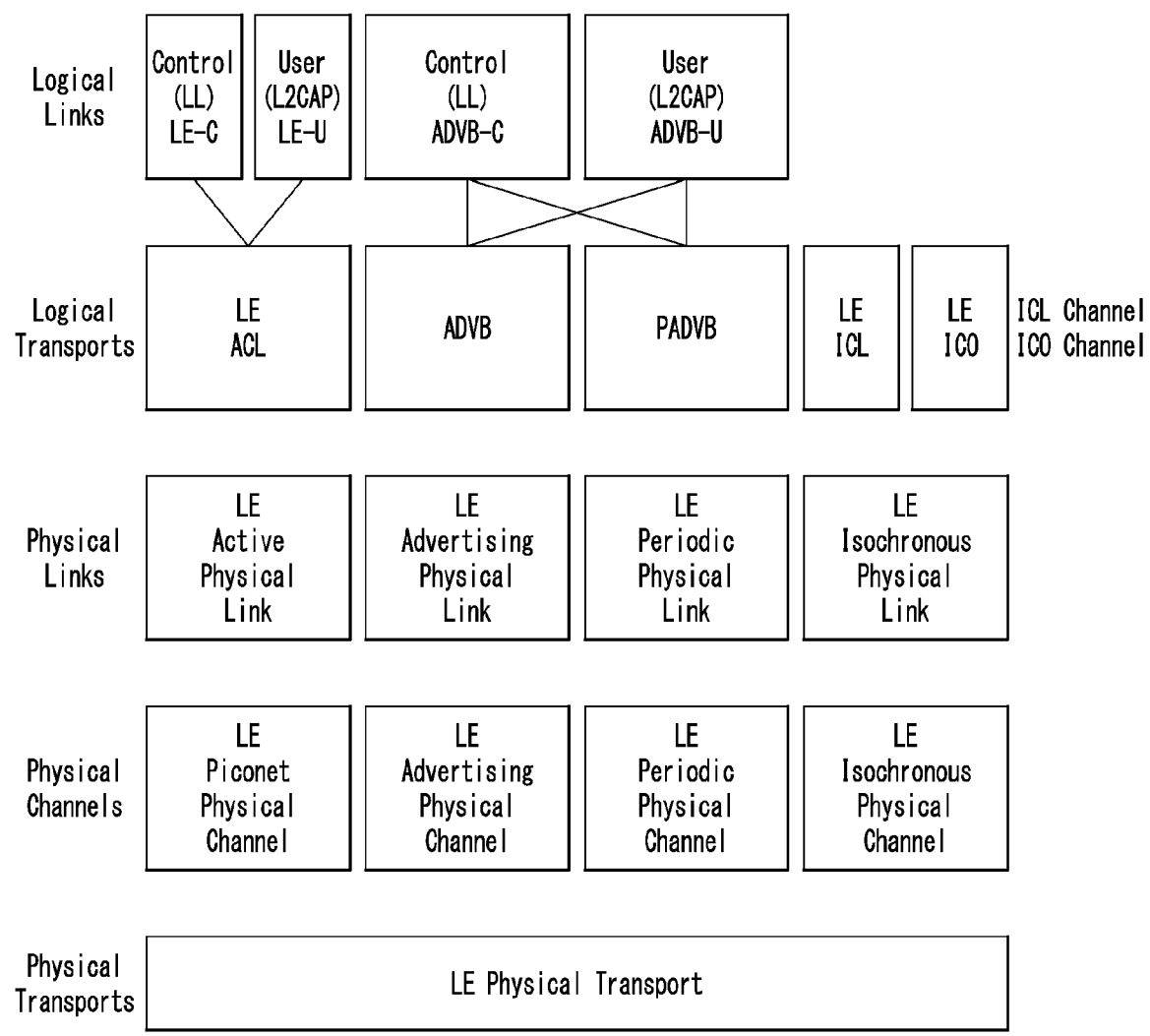

[FIG. 14]
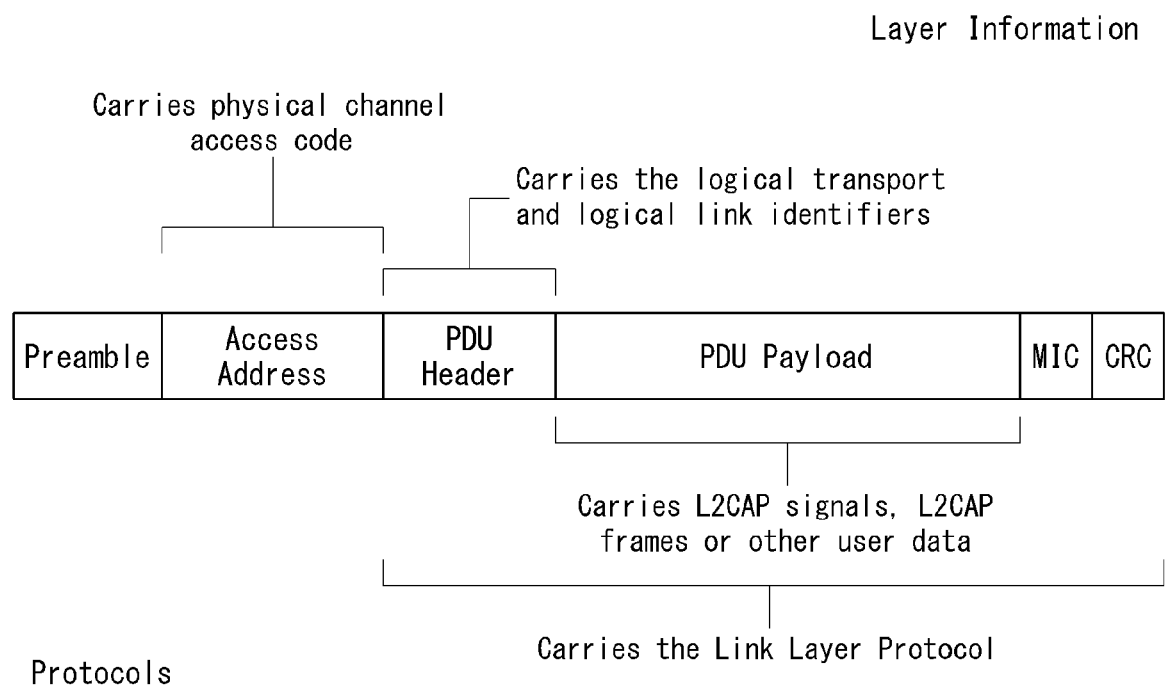

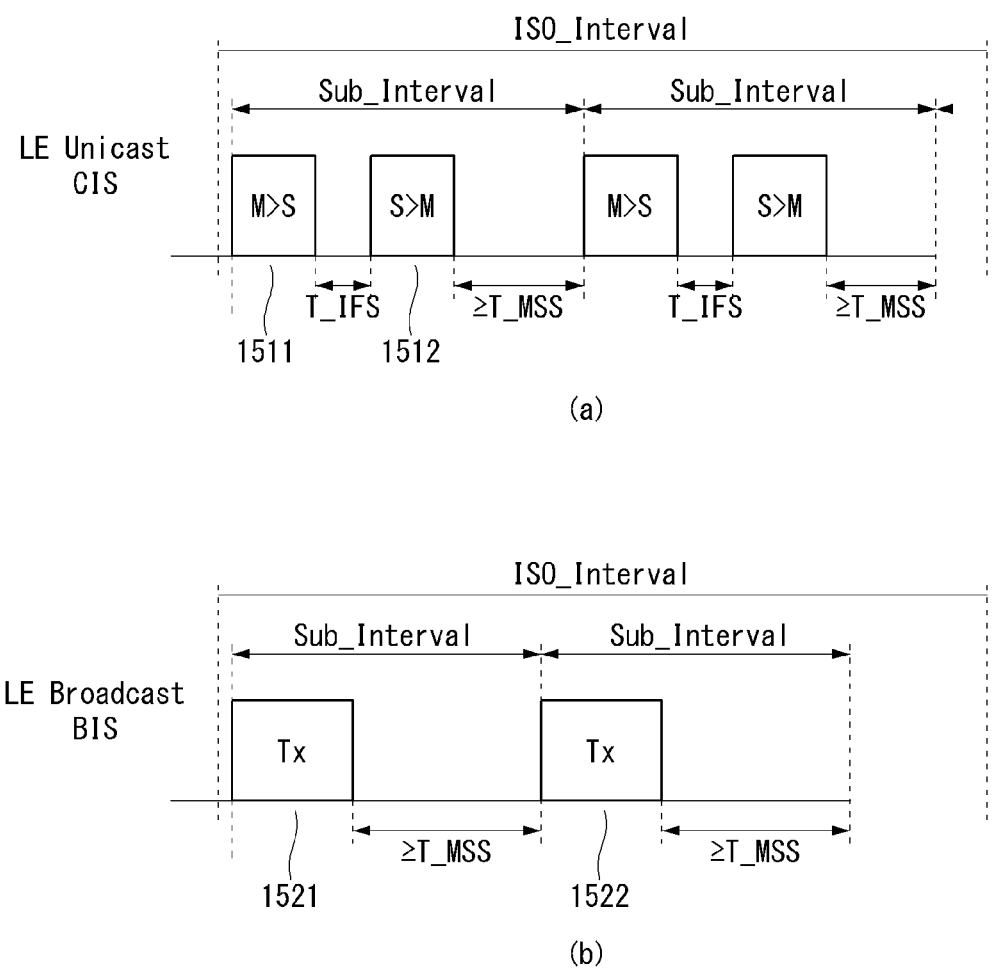
[FIG. 15]

[FIG. 16]
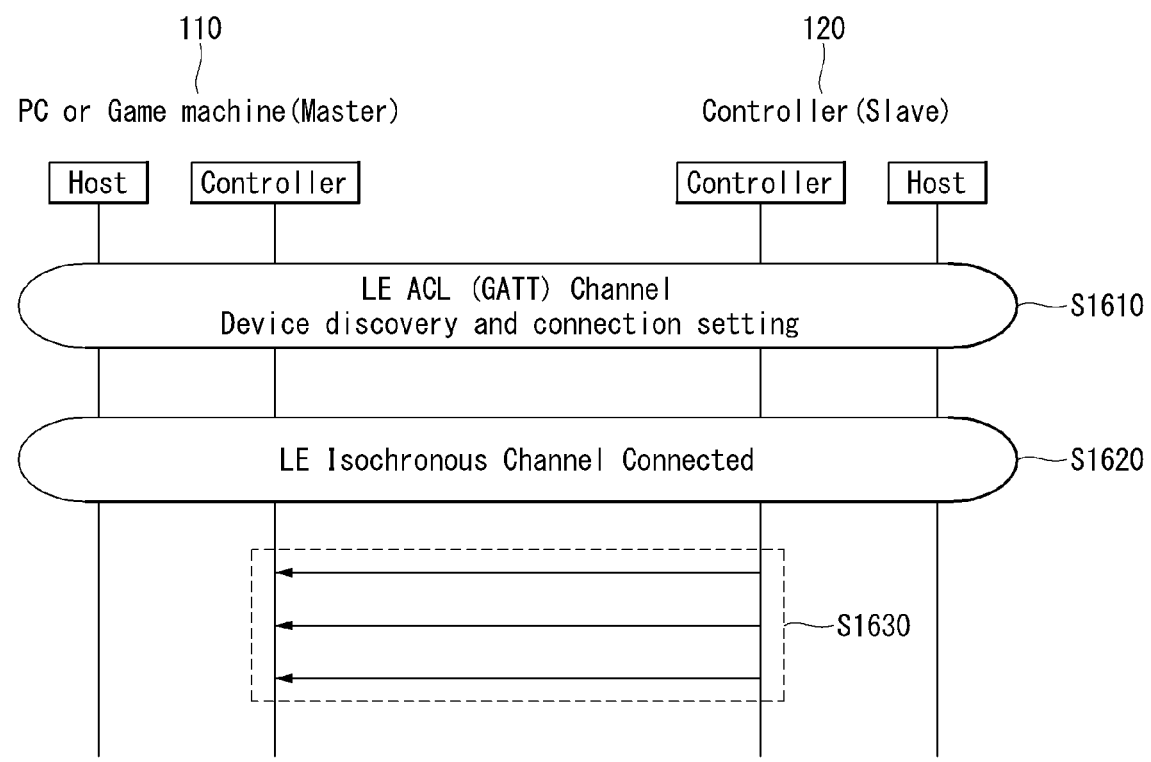

[FIG. 17]
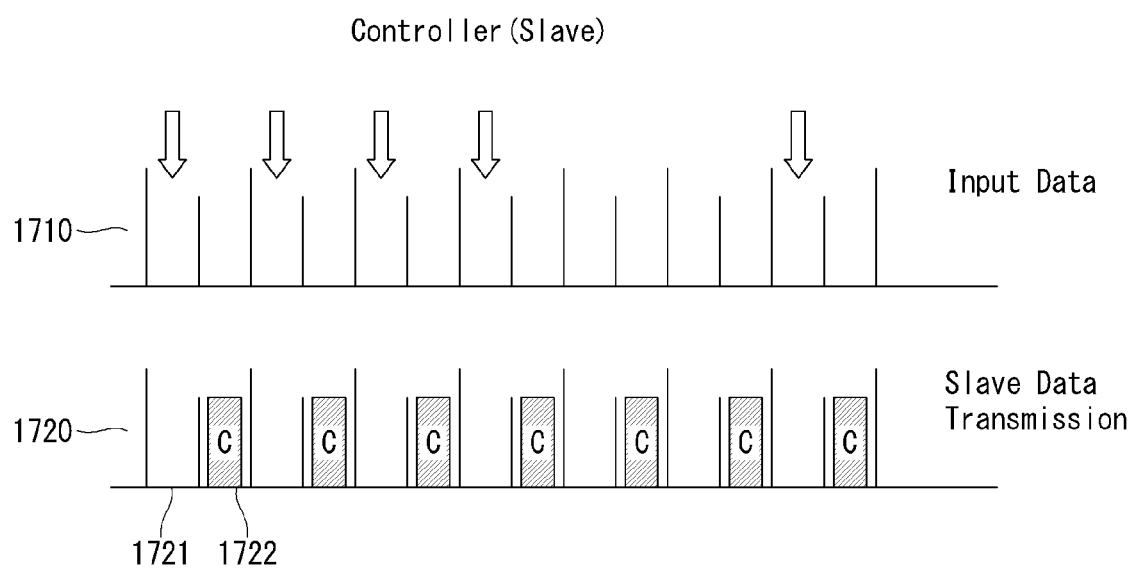

[FIG. 18]
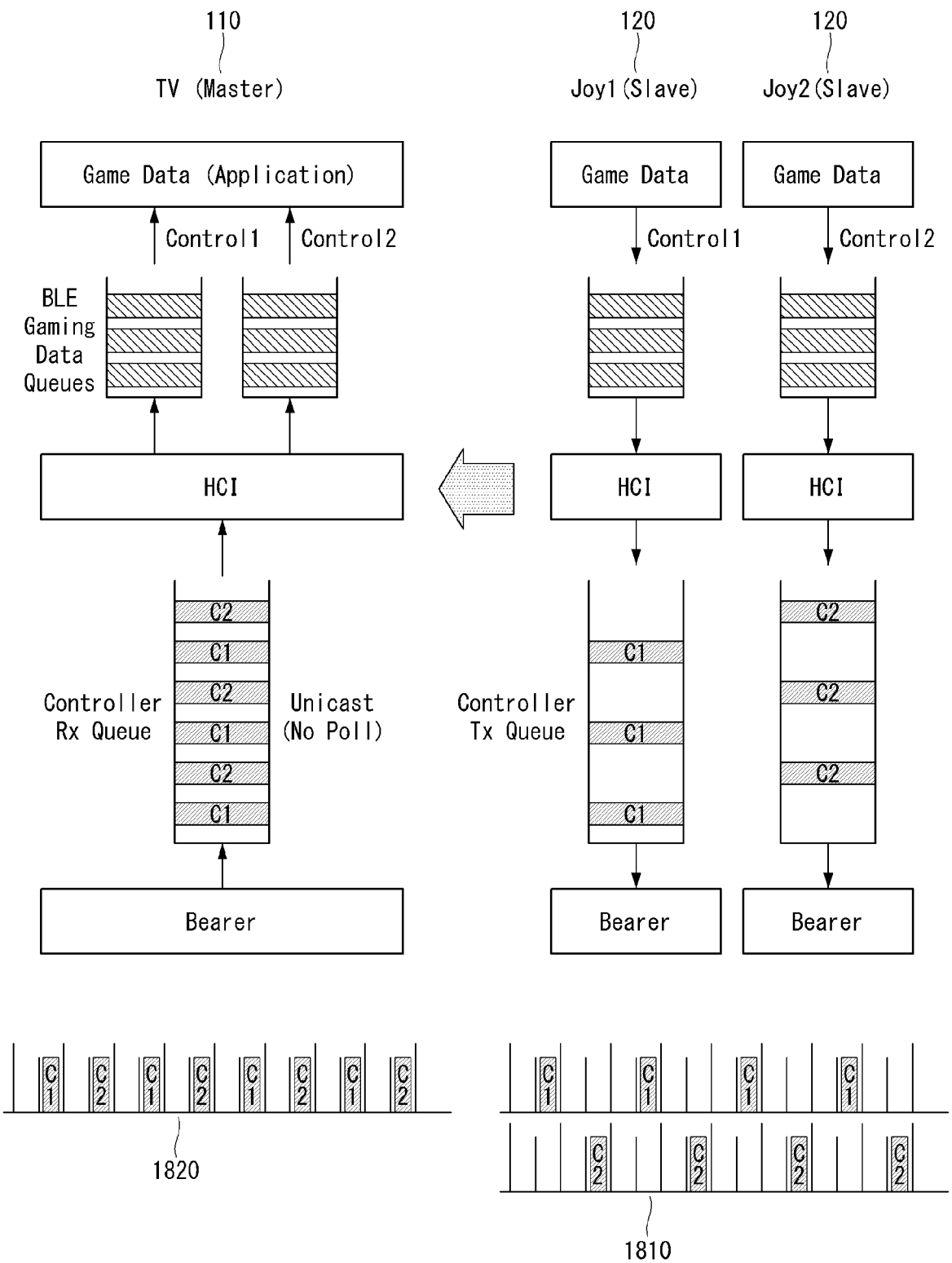

【FIG. 19】
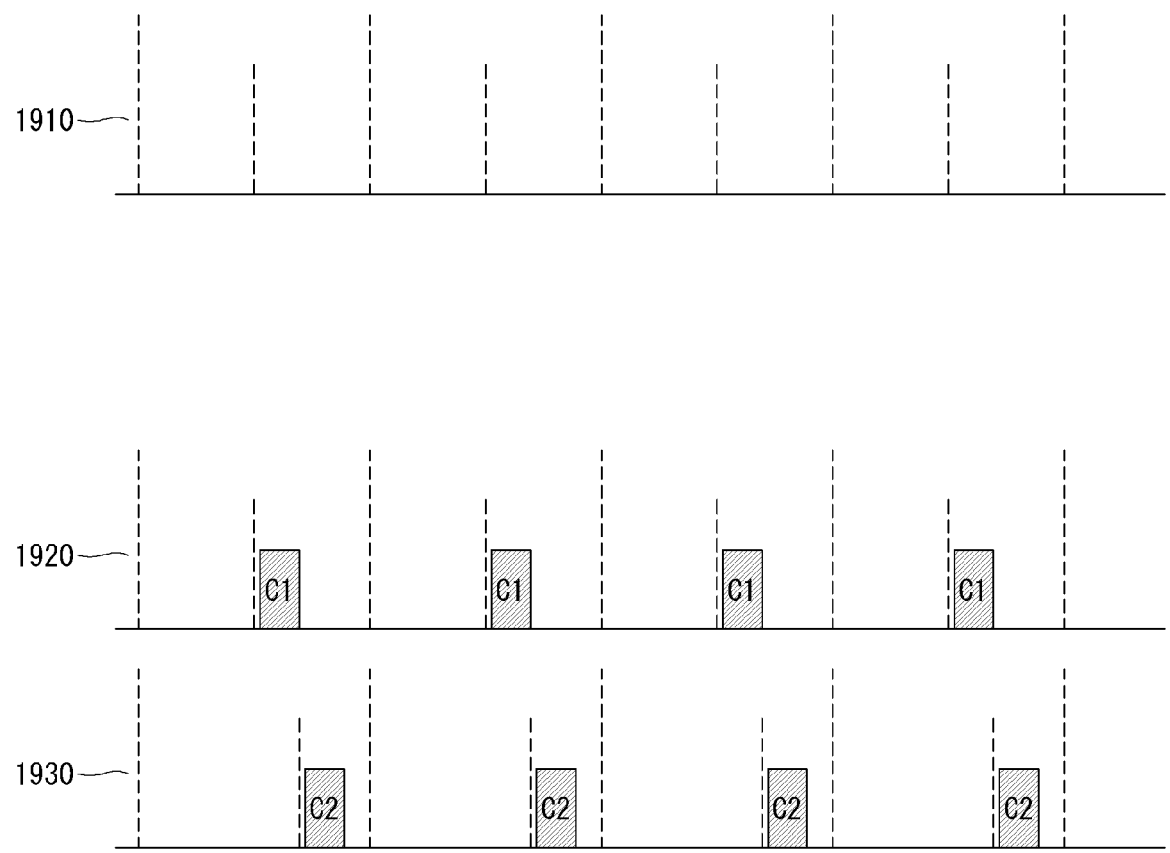

[FIG. 20]
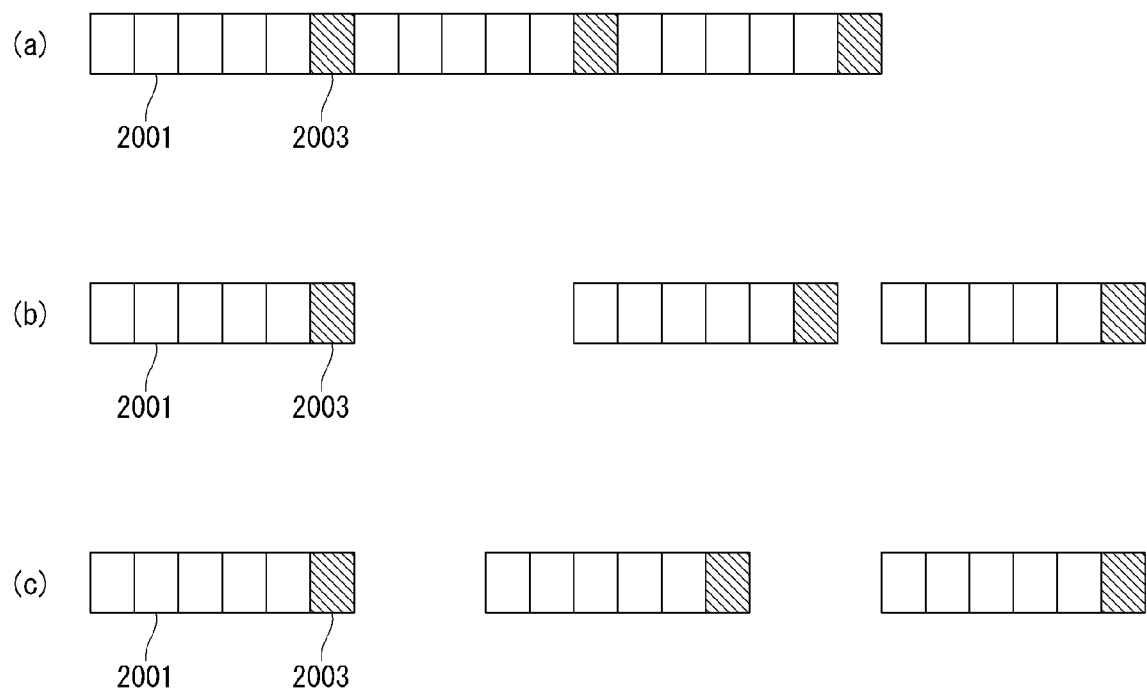

[FIG. 21]
(a) 
5ms
(b) 
(c) 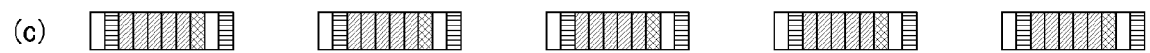
2101
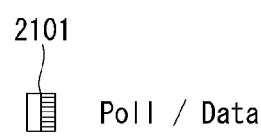
Poll / Data
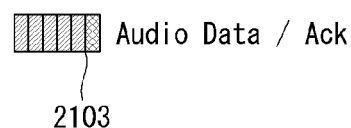
Audio Data / Ack
2103

[FIG. 22]
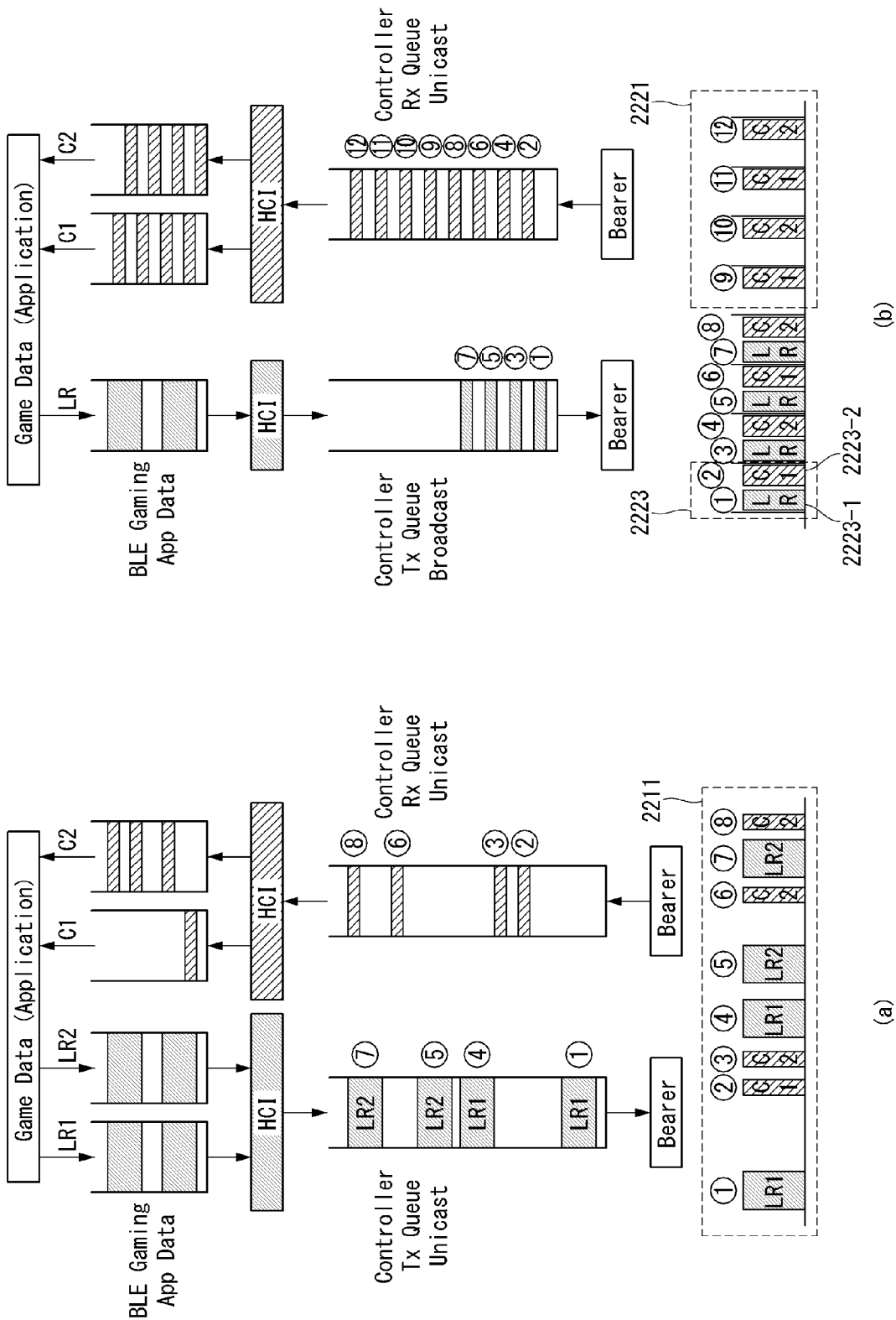

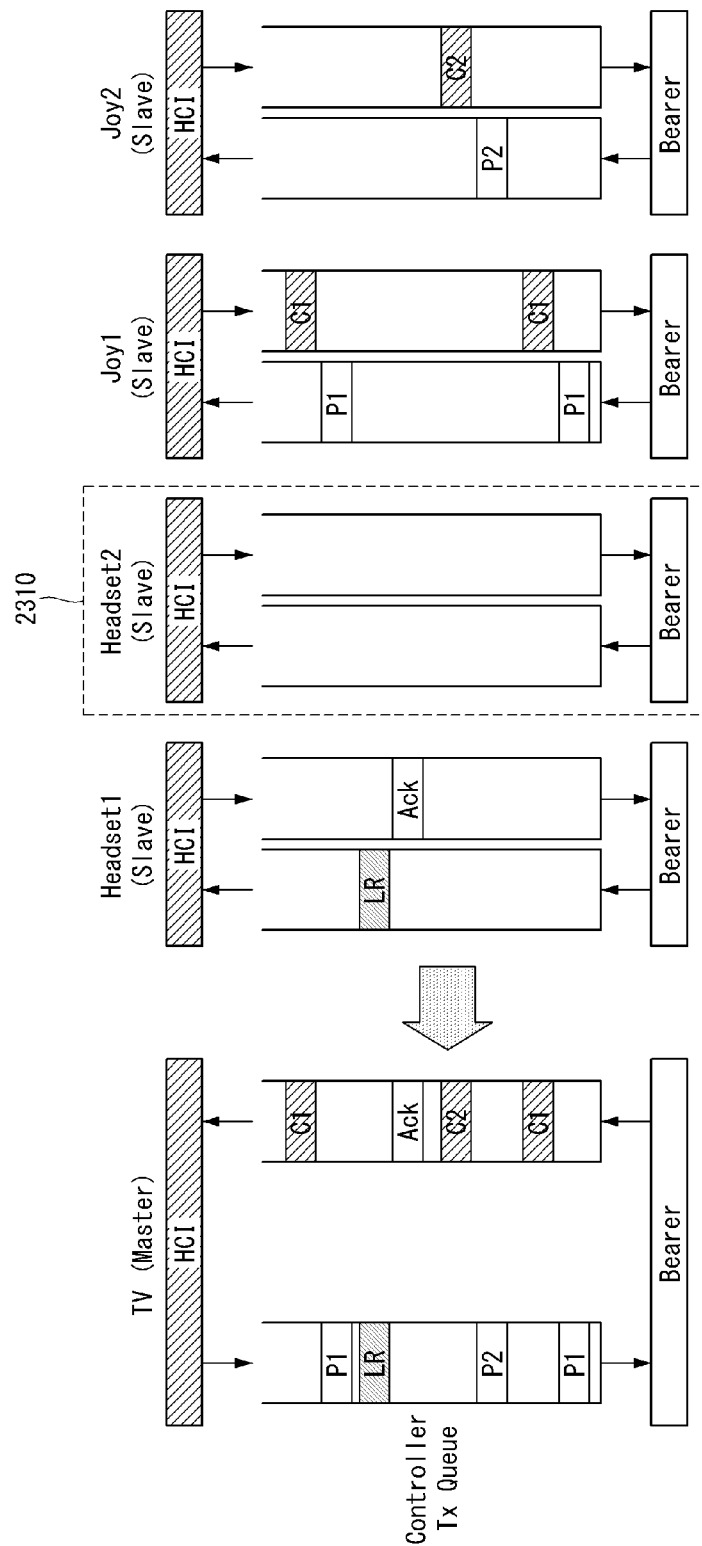
[FIG. 23]

[FIG. 24]
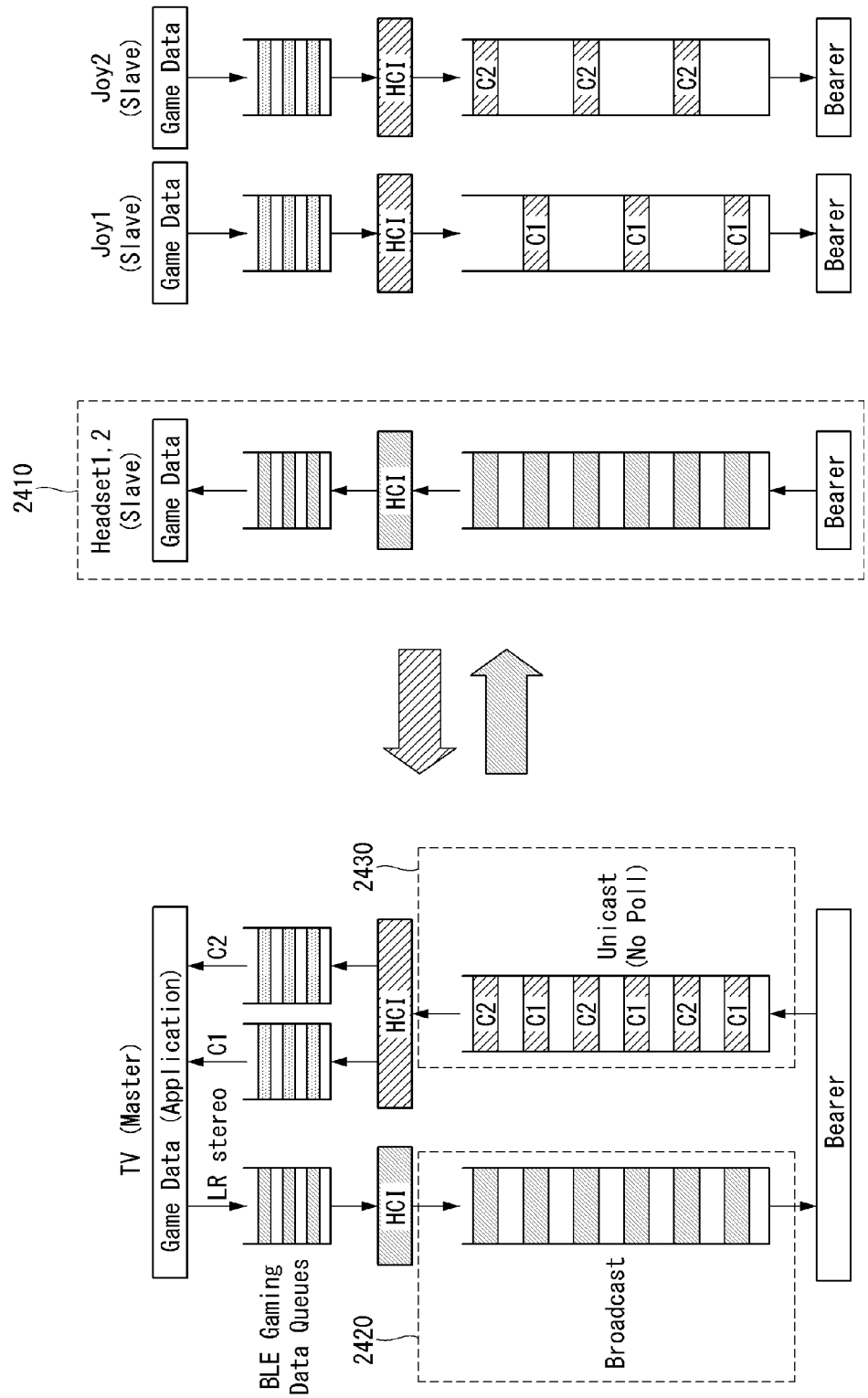

[FIG. 25]
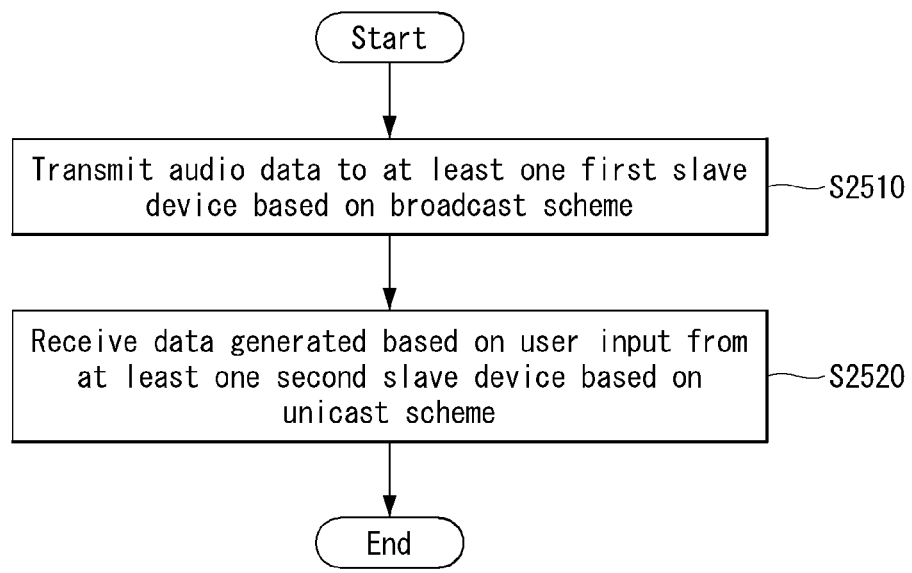

METHOD AND DEVICE FOR TRANSMITTING AUDIO DATA IN SHORT-RANGE WIRELESS COMMUNICATION SYSTEM

CROSS-REFERENCE TO RELATED APPLICATIONS

This application is the National Stage filing under 35 U.S.C. 371 of International Application No. PCT/KR2021/018009, filed on Dec. 1, 2021, which claims the benefit of earlier filing date and right of priority to Korean Application No. 10-2020-0165884, filed on Dec. 1, 2020, the contents of which are all hereby incorporated by reference herein in their entireties.

TECHNICAL FIELD

The present disclosure relates to a method and device for transmitting data using Bluetooth technology which is a short-range communication technology in a wireless communication system, and more particularly to a method and device for transmitting audio data using Bluetooth technology.

BACKGROUND ART

Bluetooth is a near field communication standard allowing various devices to be wirelessly connected in a near field to exchange data. When two devices intend to perform wireless communication using Bluetooth communication, a user performs a procedure for discovering a Bluetooth device with which he or she wants to communicate and requesting a connection. In the present disclosure, a device may refer to an apparatus or an appliance.

In this instance, the user may search for a Bluetooth device based on a Bluetooth communication method to be used using the Bluetooth device, and then perform a connection.

Examples of the Bluetooth communication method include a basic rate/enhanced data rate (BR/EDR) method and a low energy (LE) method which is a low power method. The BR/EDR method may be referred to as Bluetooth classic. The Bluetooth classic method includes a Bluetooth technology that has been continued from Bluetooth 1.0 using a basic rate and a Bluetooth technology using an enhanced data rate supported since Bluetooth 2.0.

The Bluetooth low energy (hereinafter 'Bluetooth LE') technology has been applied since Bluetooth 4.0 and can stably provide information of hundreds of kilobytes (KB) by consuming low energy. The BLE technology exchanges information between devices by utilizing an attribute protocol. This BLE method can reduce energy consumption by reducing overhead of a header and simplifying an operation.

Some Bluetooth devices have no display or user interface. Complexity of connection/management/control/disconnection between various types of Bluetooth devices and between Bluetooth devices applying similar technologies has increased.

Further, Bluetooth can achieve a relatively high speed at relatively low energy and low cost, but a transmission distance is generally limited to a maximum of 100 m. Therefore, Bluetooth is suitable for use in a limited space.

DISCLOSURE

Technical Problem

An object of the present disclosure is to provide a method for transmitting audio data in a short-range wireless communication system, and a device therefor.

Another object of the present disclosure is to provide a method for a plurality of slave devices to transmit isochronous data to a master device with a low delay, and a device therefor.

Another object of the present disclosure is to provide a method for a master device to transmit audio data to slave devices at regular data packet intervals, and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

The present disclosure provides a method of transmitting audio data in a short-range wireless communication system and a device therefor.

More specifically, in one aspect of the present disclosure, there is provided a method of transmitting, by a master device, audio data in a short-range wireless communication system, the method comprising transmitting, to at least one first slave device, the audio data based on a broadcast scheme; and receiving, from at least one second slave device, data generated based on a user input based on a unicast scheme, wherein (i) a transmission of the audio data and (ii) a reception of the data generated based on the user input are performed based on at least one time duration periodically allocated for (i) the transmission of the audio data and (ii) the reception of the data generated based on the user input, and wherein each of the at least one time duration includes (i) a first time duration for the transmission of the audio data and (ii) a second time duration for the reception of the data generated based on the user input.

The method may further comprise dividing the audio data based on a time length of the at least one time duration to generate at least one sub-audio data. The at least one sub-audio data may be transmitted in the same specific number of time durations as a number of the at least one sub-audio data among the at least one time duration.

Each of the at least one sub-audio data may be transmitted in one time duration among the specific number of time durations.

The specific number of time durations may be contiguous in a time domain.

Each of the at least one sub-audio data may be transmitted in the first time duration of the one time duration.

The data generated based on the user input may be transmitted in the second time duration of the one time duration.

The first time duration may be located earlier in time than the second time duration within the one time duration.

Further, (i) after all the sub-audio data is transmitted and (ii) before new audio data is generated, only data based on the user input may be transmitted in a time duration after the specific number of time durations among the at least one time duration.

Each of the at least one time duration may be a unit of time at which a frequency hopping is performed.

Receiving the data generated based on the user input based on the unicast scheme may comprise forming a connection with each of the at least one second slave device in order to receive the data generated based on the user input from the at least one second slave device; and, based on the formed connection, receiving, from each of the at least one second slave device, the data generated based on the user input.

Based on there being no the user input in a specific time duration among the at least one time duration, the reception of the data generated based on the user input in the specific time duration may be omitted.

The reception of the data generated based on the user input from each of the at least one second slave device may be performed in different time durations.

A number of the different time durations may be the same as a number of the at least one second slave device.

The method may further comprise transmitting, to the at least one second slave device, transmission duration allocation scheme information on a scheme in which the different time durations are respectively allocated to the at least one second slave device.

A time duration in which each of the at least one second slave device transmits the data generated based on the user input may be determined based on the transmission duration allocation scheme information.

In another aspect of the present disclosure, there is provided a master device transmitting audio data in a short-range wireless communication system, the master device comprising a transmitter configured to transmit a radio signal; a receiver configured to receive the radio signal; at least one processor; and at least one computer memory operably connectable to the at least one processor, wherein the at least one computer memory is configured to store instructions that allow the at least one processor to perform operations based on being executed by the at least one processor, wherein the operations comprise transmitting, to at least one first slave device, the audio data based on a broadcast scheme; and receiving, from at least one second slave device, data generated based on a user input based on a unicast scheme, wherein (i) a transmission of the audio data and (ii) a reception of the data generated based on the user input are performed based on at least one time duration periodically allocated for (i) the transmission of the audio data and (ii) the reception of the data generated based on the user input, and wherein each of the at least one time duration includes (i) a first time duration for the transmission of the audio data and (ii) a second time duration for the reception of the data generated based on the user input.

Advantageous Effects

The present disclosure has an effect of transmitting audio data in a short-range wireless communication system.

The present disclosure also has an effect that a plurality of slave devices can transmit isochronous data to a master device with a low delay.

The present disclosure also has an effect that even if a plurality of slave devices transmit isochronous data, the plurality of slave devices can transmit the isochronous data to a master device with a delay of the same degree as when one slave device transmits the isochronous data.

The present disclosure also has an effect of improving a data transfer rate of a short-range wireless communication system consisting of master devices and slave devices.

The present disclosure also has an effect that a master device transmits audio data to slave devices at regular data packet intervals, and a bandwidth (BW) can be efficiently used.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

FIG. 1 schematically illustrates an example of a wireless communication system using a Bluetooth low energy technology described in the present disclosure.

FIG. 2 illustrates an example of an internal block diagram of a device capable of implementing methods described in the present disclosure.

FIG. 3 illustrates an example of a Bluetooth communication architecture to which methods described in the present disclosure are applicable.

FIG. 4 illustrates an example of a structure of a generic attribute profile (GATT) of Bluetooth low energy.

FIG. 5 is a flowchart illustrating an example of a connecting procedure method in Bluetooth low energy technology to which the present disclosure is applicable.

FIG. 6 illustrates an example of a data transmission/reception method in a BR/EDR scheme for helping understanding of a method described in the present disclosure.

FIG. 7 illustrates another example of a data transmission/reception method in a BR/EDR scheme for helping understanding of a method described in the present disclosure.

FIG. 8 illustrates an example of a data packet format for data transmission/reception in a BR/EDR scheme for helping understanding of a method described in the present disclosure.

FIG. 9 illustrates another example of a data transmission/reception method in a BR/EDR scheme for helping understanding of a method described in the present disclosure.

FIG. 10 illustrates another example of a data transmission/reception method in a BR/EDR scheme for helping understanding of a method described in the present disclosure.

FIG. 11 illustrates another example of a data transmission/reception method in a BR/EDR scheme for helping understanding of a method described in the present disclosure.

FIG. 12 illustrates an example of using a game content using Bluetooth low energy for helping understanding of a method described in the present disclosure.

FIG. 13 illustrates an example of a protocol stack to which a method described in the present disclosure is applicable.

FIG. 14 illustrates an example of a data packet format capable of being used in a protocol stack to which a method described in the present disclosure is applicable.

FIG. 15 illustrates an example of a data transmission/reception method to which a method described in the present disclosure is applicable.

FIG. 16 illustrates an example on which a method described in the present disclosure is performed.

FIG. 17 illustrates an example of isochronous data transmission of a slave device.

FIG. 18 illustrates an example of a method of transmitting isochronous data of a slave device described in the present disclosure.

FIG. 19 illustrates another example of a method of transmitting isochronous data of a slave device described in the present disclosure.

FIG. 20 illustrates an example of a method of transmitting audio data using a short-range wireless communication technology.

FIG. 21 illustrates another example of a method of transmitting audio data using a short-range wireless communication technology.

FIG. 22 illustrates an example where a method of transmitting audio data described in the present disclosure is performed.

FIG. 23 illustrates an example for helping understanding of a method of transmitting audio data described in the present disclosure.

FIG. 24 illustrates another example where a method of transmitting audio data described in the present disclosure is performed.

FIG. 25 is a flowchart illustrating an example where a method of transmitting audio data in a short-range wireless communication system described in the present disclosure is performed by a master device.

MODE FOR INVENTION

The accompanying drawings, which are included to provide a further understanding of the present disclosure and constitute a part of the detailed description, illustrate embodiments of the present disclosure and serve to explain technical features of the present disclosure together with the description. Reference will now be made in detail to embodiments of the disclosure, examples of which are illustrated in the accompanying drawings. Wherever possible, the same reference numbers will be used throughout the drawings to refer to the same or like parts. Detailed descriptions of known arts will be omitted if such may mislead the embodiments of the disclosure. It is noted that the accompanying drawings are only for easily understanding the spirit of the present disclosure and it should not be interpreted that the spirit of the present disclosure is limited by the accompanying drawings.

Hereinafter, a method and a device related to the present disclosure will be described in more detail with reference to the drawings. In addition, a general term used in the present disclosure should be interpreted as defined in a dictionary or contextually, and should not be interpreted as an excessively reduced meaning. Further, singular expression used in the present disclosure includes plural expression unless the context clearly dictates otherwise. In the present disclosure, a term such as "comprising" or "including" should not be interpreted as necessarily including all various components or various steps disclosed in the present disclosure, and it should be interpreted that some component or some steps among them may not be included or additional components or steps may be further included. Suffixes "unit", "module", and "section" for components used in the following description are given or mixed in consideration of easy preparation of the disclosure only and do not have their own distinguished meanings or roles. The terms "first", "second", and the like are used to differentiate a certain component from other components, but the scope of should not be construed to be limited by the terms.

FIG. 1 schematically illustrates an example of a wireless communication system using a Bluetooth low energy technology described in the present disclosure.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, can be produced at low cost, and can greatly reduce power consumption through a low data transfer rate. Hence, when a coin cell battery is used, it can operate for more than one year.

Further, in the BLE technology, an inter-device connecting procedure is simplified, and a packet size is also designed to be small compared to the Bluetooth BR/EDR technology.

In the BLE technology, (1) the number of RF channels is 40, (2) a data transfer rate supports 1 Mbps, (3) topology has a scatternet structure, (4) latency is 3 ms, (5) a maximum current is 15 mA or lower, (6) output power is 10 mW (10 dBm) or less, and (7) it is mainly used in applications such as cellular phones, clocks, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may simultaneously operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system, and the wireless communication system may include other components in addition to the server device and the client device.

The server device refers to a device that receives data from the client device, directly communicates with the client device, and provides data to the client device through a response when receiving a data request from the client device.

Further, the server device sends a notice/notification message and an indication message to the client device in order to provide data information to the client device. When the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. For example, in the wireless communication system, a private piconet between the devices may be established to rapidly and safely exchange files, documents, and the like.

FIG. 2 illustrates an example of an internal block diagram of a device capable of implementing methods described in the present disclosure.

As illustrated in FIG. 2, the master device 110 includes a user input interface 112, a power supply unit 113, a control unit 114, a memory unit 115, a network interface 116 including a Bluetooth interface, a storage 117, a display unit 118, and a multimedia module 119.

The user input interface 112, the power supply unit 113, the control unit 114, the memory unit 115, the network interface 116 including the Bluetooth interface, the storage 117, the display unit 118, and the multimedia module 119 are functionally connected to each other to perform methods described in the present disclosure.

Further, as illustrated in FIG. 2, a slave device (#1 and #2) 120 includes a user input interface 122, a power supply unit 123, a control unit 124, a memory unit 125, a network interface 126 including a Bluetooth interface, a storage 127, a display unit 128, and a multimedia module 129.

The user input interface 122, the power supply unit 123, the control unit 124, the memory unit 125, the network interface 126 including the Bluetooth interface, the storage 127, the display unit 128, and the multimedia module 129 are functionally connected to each other to perform methods described in the present disclosure.

The network interfaces 116 and 126 refer to units (or modules) capable of transmitting requests/responses, commands, notifications, indication/confirmation messages, etc., or data between devices using Bluetooth technology.

The memory units 115 and 125 refer to units implemented in various types of devices and refer to units in which various types of data are stored. The storages 117 and 127 refer to units that perform a function similar to a function of a memory.

The control units 114 and 124 refer to modules that controls the overall operation of the master device 110 or the slave device 120, and request to transmit a message to the network interface or control to process a received message.

The control units 114 and 124 may include an application-specific integrated circuit (ASIC), another chipset, a logic circuit, and/or a data processing device.

The memory units 115 and 125 may include a read-only memory (ROM), a random access memory (RAM), a flash memory, a memory card, a storage medium, and/or other storage devices.

The memory units 115 and 125 may be inside or outside the processors 114 and 124 and may be connected to the processors 114 and 124 by various well-known means.

The display units 118 and 128 refer to modules for providing status information and message exchange information of the device to a user through a screen.

The power supply units 113 and 123 refers to modules that receive external power and internal power under the control of the control unit and supply power necessary for the operation of each component.

As discussed above, the BLE technology has a small duty cycle and can greatly reduce power consumption through a low data transfer rate.

FIG. 3 illustrates an example of a Bluetooth communication architecture to which methods described in the present disclosure are applicable.

Specifically, FIG. 3 illustrates an example of an architecture of Bluetooth low energy (LE).

As illustrated in FIG. 3, the BLE structure includes a controller stack capable of processing a wireless device interface for which timing is important, and a host stack capable of processing high level data.

The controller stack may also be called a controller. However, in order to avoid confusion with the processor that is an internal component of the device described with reference to FIG. 2, the controller stack may be used below.

First, the controller stack may be implemented using a communication module which may include a Bluetooth wireless device and a processor module which may include a processing device such as a microprocessor.

The host stack may be implemented as part of an OS operating on the processor module, or as an instance instantiation of a package on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. However, the host stack is not limited thereto and may include various protocols and profiles.

The host stack multiplexes various protocols and profiles provided by Bluetooth high class using the L2CAP.

First, the L2CAP 360 provides one bilateral channel for transmitting data to a specific protocol or a specific profile.

The L2CAP may operate to multiplex data between higher layer protocols, segment or reassemble packages, and manage multicast data transmission.

BLE uses three fixed channels (one channel for signaling, one channel for a security manager, and one channel for an attribute protocol).

On the other hand, BR/EDR uses a dynamic channel and supports a protocol service multiplexer, retransmission, streaming mode, and the like.

The SM 350 is a protocol that authenticates a device and provides a key distribution.

The ATT 340 defines rules for accessing data of an opponent device based on a server-client structure. The ATT 340 has six message types (Request, Response, Command, Notification, Indication, and Confirmation).

① Request and Response message: the Request message is a message through which the client device requests specific information from the server device, and the Response message is a response message to the Request message and is transmitted from the server device to the client device.

②Command message: it is a message transmitted from the client device to the server device so as to indicate a command for a specific operation, and the server device does not send a response to the Command message to the client device.

③Notification message: it is a message transmitted from the server device to the client device in order to provide a notification such as an event, and the client device does not send a confirmation message for the Notification message to the server device.

④Indication and Confirm message: it is a message transmitted from the server device to the client device in order to provide a notification such as an event. Unlike the Notification message, the client device sends a confirmation message for the Indication message to the server device.

The generic access profile (GAP) is a layer newly implemented for the purpose of the BLE technology, and is used to control how a role selection and a multi-profile operation for communication between BLE devices take place.

The GAP is mainly used for device discovery, connection establishment, and security procedures. The GAP defines a method for providing information to the user and also defines the following attribute types.

①Service: a combination of behaviors related to data, and it defines the basic operation of a device
②Include: defining a relationship between services
③Characteristics: a data value used in service
④Behavior: a computer readable format defined by UUID (Universal Unique Identifier, value type)

The GATT-based profiles are dependent on the GATT and are mainly applied to the BLE devices. The GATT-based profiles may include Battery, Time, FindMe, Proximity, Time, Object Delivery Service, and so on. The GATT-based profiles are described in detail as follows.

Battery: a method of exchanging battery information
Time: a method of exchanging time information
FindMe: providing an alarm service depending on the distance
Proximity: a method of exchanging battery information
Time: a method of exchanging time information The GATT may operate as a protocol by which to describe how the ATT is used upon configuration of services. For example, the GATT may be used to define how the ATT profiles are grouped together with services and to describe characteristics associated with the services.

Therefore, the GATT and the ATT describe device states and services, and how features are associated with each other and how they are used.

The controller stack includes a physical layer 390, a link layer 380, and a host controller interface 370.

The physical layer 390 (or a wireless transmission and reception module) transmits and receives a radio signal of 2.4 GHz, and uses a Gaussian Frequency Shift Keying (GFSK) modulation and a frequency hopping scheme including 40 RF channels.

The link layer 380 transmits or receives Bluetooth packets.

Furthermore, the link layer establishes a connection between devices after performing advertising and scanning functions using three advertising channels, and provides a function of exchanging a data packet of up to 42 bytes through 37 data channels.

The host controller interface (HCI) provides an interface between the host stack and the controller stack so that the host stack provides commands and data to the controller stack and the controller stack provides events and data to the host stack.

Hereinafter, procedures of the Bluetooth low energy (BLE) technology are described briefly.

The BLE procedure may include a device filtering procedure, an advertising procedure, a scanning procedure, a discovering procedure, and a connecting procedure.

Device Filtering Procedure

A device filtering procedure is a method for the controller stack to reduce the number of devices performing a response to a request, an indication, or a notification, etc.

When all devices receive a request, all the devices do not need to respond to the received request. Therefore, the controller stack reduces the number of requests to be transmitted, and thus can control so that power consumption at a BLE controller stack is reduced.

An advertising device or a scanning device may perform the device filtering procedure in order to restrict the number of devices receiving advertising packets, scan requests, or connection requests.

The advertising device refers to a device transmitting an advertising event, that is, a device performing advertisement, and is also called an advertiser.

A scanning device refers to a device performing scanning, that is, a device transmitting a scan request.

In the BLE, if the scanning device receives some advertising packets from the advertising device, the scanning device has to transmit a scan request to the advertising device.

However, if the scan request does not need to be transmitted as the device filtering procedure is used, the scanning device may ignore the advertising packets transmitted by the advertising device.

The device filtering procedure may be used even in the connection request procedure. If the device filtering is used for the connection request procedure, there is no need to transmit a response to the connection request by ignoring the connection request.

Advertising Procedure

An advertising device performs an advertising procedure to perform a non-directional broadcast using devices within an area of the advertising device.

The non-directional broadcast refers to a broadcast in all directions not a broadcast in a specific direction.

Unlike the non-directional broadcast, a directional broadcast refers to a broadcast in a specific direction. The non-directional broadcast occurs without a connecting procedure between the advertising device and a device in a listening state (hereinafter referred to as a "listening device").

The advertising procedure is used to establish Bluetooth connection with a contiguous initiating device.

Alternatively, the advertising procedure may be used to provide a periodic broadcast of user data to the scanning devices which perform listening through an advertising channel.

In the advertising procedure, all advertisements (or advertising events) are broadcasted through an advertising physical channel.

The advertising devices may receive a scan request from listening devices which perform a listening operation in order to obtain additional user data from the advertising devices. The advertising device sends a response to the scan request to the device transmitting the scan request through the same advertising physical channel as an advertising physical channel receiving the scan request.

While broadcast user data sent as part of advertising packets is dynamic data, scan response data is generally static data.

The advertising device may receive a connection request from the initiating device on an advertising (broadcast) physical channel. If the advertising device has used a connectable advertising event and the initiating device has not been filtered by the device filtering procedure, the advertising device stops an advertisement and enters a connected mode. The advertising device may resume the advertisement after the connected mode.

Scanning Procedure

A device performing a scan operation, that is, a scanning device performs a scanning procedure in order to listen to the non-directional broadcast of user data from advertising devices using an advertising physical channel.

The scanning device transmits a scan request to the advertising device through an advertising physical channel, in order to request additional data from the advertising device. The advertising device includes additional data requested by the scanning device through the advertising physical channel, and sends a scan response to the scan request.

The scanning procedure may be used while the scanning device is connected to another BLE device in a BLE piconet.

If the scanning device receives a broadcasted advertising event and is in an initiator mode where a connection request can be initiated, the scanning device may initiate Bluetooth connection with the advertising device by transmitting a connection request to the advertising device through the advertising physical channel.

If the scanning device transmits the connection request to the advertising device, the scanning device stops the initiator mode scanning for additional broadcast and enters the connected mode.

Discovering Procedure

Devices capable of Bluetooth communication (hereinafter referred to as a "Bluetooth devices") perform the advertising procedure and the scanning procedure in order to discover devices around the Bluetooth devices or in order to be discovered by other devices within a given area.

A discovering procedure is asymmetrically performed. A Bluetooth device searching for another Bluetooth device nearby is called a discovering device, and performs listening in order to search for devices advertising a scannable advertising event. A Bluetooth device which can be discovered and used by other devices is called a discoverable device. The discoverable device actively broadcasts an advertising event so that other devices can scan it through an advertising (or broadcast) physical channel.

Both the discovering device and the discoverable device may already have been connected to other Bluetooth devices in a piconet.

Connecting Procedure

A connecting procedure is asymmetric. The connecting procedure requests other Bluetooth devices to perform the scanning procedure while a specific Bluetooth device performs the advertising procedure.

That is, the advertising procedure may be a primary task to be performed, and as a result, only one device will respond to an advertisement. After receiving a connectable advertising event from the advertising device, the connecting procedure may be initiated by sending a connection request to the advertising device through an advertising (or broadcast) physical channel.

Operation states defined in the BLE technology, that is, an advertising state, a scanning state, an initiating state, and a connection state, are described briefly below.

Advertising State

The link layer (LL) enters an advertising state by an indication of a host (stack). If the link layer is in the advertising state, the link layer transmits advertising packet data units (PDUs) at advertising events.

Each advertising event includes at least one advertising PDU, and the advertising PDUs are transmitted through advertising channel indices used. The advertising event may be terminated when the advertising PDU is transmitted through the advertising channel index used, or the advertising event may be earlier terminated when the advertising device needs to secure a space in order to perform other functions.

Scanning State

The link layer enters the scanning state by an indication of a host (stack). In the scanning state, the link layer listens to advertising channel indices.

The scanning state includes two types of passive scanning and active scanning, and each scanning type is determined by the host.

No separate time or advertising channel index is defined to perform scanning.

During the scanning state, the link layer listens to an advertising channel index during scanWindow duration. scanInterval is defined as an interval between start points of two consecutive scan windows.

If there is no scheduling collision, the link layer has to perform listening in order to complete all the scanInterval of the scanWindow as indicated by the host. In each scanWindow, the link layer has to scan other advertising channel indices. The link layer uses all available advertising channel indices.

In the passive scanning, the link layer only receives packets, and is unable to transmit any packet.

In the active scanning, the link layer performs listening in order to depend on the advertising PDU type that can request the advertising PDUs and additional information related to the advertising device from the advertising device.

Initiating State

The link layer enters an initiating state by an indication of a host (stack).

When the link layer is in the initiating state, the link layer performs listening to advertising channel indices.

During the initiating state, the link layer listens to the advertising channel index during the scanWindow duration.

Connection State

The link layer enters a connection state when a device performing the connection request, i.e., an initiating device transmits CONNECT_REQ PDU to the advertising device or when the advertising device receives CONNECT_REQ PDU from the initiating device.

After entering the connections state, it is considered that the connection is generated. However, it does not need to be considered so that the connection is established at the time of entering the connections state. An only difference between a newly generated connection and a previously established connection is only a link layer connection supervision timeout value.

When two devices are connected to each other, two devices play difference roles.

A link layer performing a master role is referred to as a master, and a link performing a slave role is referred to as a slave. The master controls a timing of a connection event, and the connection event refers to a time at which the master and the slave are synchronized.

A packet defined in the Bluetooth interface will be briefly described below. BLE devices use packets defined below.

Packet Format

The link layer has only one packet format used for both an advertising channel packet and a data channel packet.

Each packet includes four fields of a preamble, an access address, a PDU, and a CRC.

When one packet is transmitted in an advertising physical channel, the PDU will become an advertising channel PDU, and when one packet is transmitted in a data physical channel, the PDU will become a data channel PDU.

Advertising Channel PDU

An advertising channel PDU includes a 16-bit header and various sizes of payloads.

A PDU type field of an advertising channel PDU included in the header represents PDU types defined in Table 1 below.

The procedure, the state, the packet format, etc. in the BLE technology described above may be applied to perform methods described in the present disclosure.

FIG. 4 illustrates an example of a structure of a generic attribute profile (GATT) of Bluetooth low energy.

Referring to FIG. 4, a structure for exchanging profile data of the Bluetooth low energy will be described.

Specifically, the generic attribute profile (GATT) is to define a method of transmitting and receiving data using services and characteristics between Bluetooth LE devices.

In general, a peripheral device (e.g., a sensor device) serves as a GATT server and has a definition of services and characteristics.

A GATT client sends a data request to the GATT server in order to read or write the data, and all transactions start at the GATT client and receive a response from the GATT server.

TABLE 1

| PDU Type | PDU Name | Channel | Permitted PHYs | | |
|---|---|---|---|---|---|
| | | | LE 1M | LE 2M | LE Coded |
| 0000b | ADV_IND | Primary Advertising | • | | |
| 0001b | ADV_DIRECT_IND | Primary Advertising | • | | |
| 0010b | ADV_NONCONN_IND | Primary Advertising | • | | |
| 0011b | SCAN_REQ | Primary Advertising | • | | |
| | AUX_SCAN_REQ | Secondary Advertising | • | • | • |
| 0100b | SCAN_RSP | Primary Advertising | • | | |
| 0101b | CONNECT_IND | Primary Advertising | • | | |
| | AUX_CONNECT_REQ | Secondary Advertising | • | • | • |
| 0110b | ADV_SCAN_IND | Primary Advertising | • | | |

Advertising PDU

The following advertising channel PDU types are called advertising PDUs and are used for a detailed event.

ADV_IND: a connectable non-directional advertising event

ADV_DIREC_IND: a connectable directional advertising event

ADV_NONCONN_IND: a non-connectable non-directional advertising event

ADV_SCAN_IND: a scannable non-directional advertising event

The PDUs are transmitted by the link layer in the advertising state and are received by the link layer in the scanning state or the initiating state.

Scanning PDU

The advertising channel PDU type below is called a scanning PDU and is used in a state described below.

SCAN_REQ: it is transmitted by the link layer in the scanning state and is received by the link layer in the advertising state.

SCAN_RSP: it is transmitted by the link layer in the advertising state and is received by the link layer in the scanning state.

Initiating PDU

The advertising channel PDU type below is called an initiating PDU.

CONNECT_REQ: it is transmitted by the link layer in the initiating state and is received by the link layer in the advertising state.

Data Channel PDU

The data channel PDU may have a 16-bit header and various sizes of payloads and include a message integrity check (MIC) field.

A GATT-based operation structure used in the Bluetooth LE may be based on a profile, services, and characteristics and may achieve a vertical structure illustrated in FIG. 5.

The profile may consist of one or more services, and the service may consist of one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one data and has a 16-bit or 128-bit UUID similar to the service.

The characteristic is defined as a value of various information and requires one attribute to contain each information. The characteristic may use several consecutive attributes.

The attribute includes four components, which have the following meanings.

handle: address of attribute
Type: type of attribute
Value: value of attribute
Permission: access authority to attribute FIG. 5 is a flowchart illustrating an example of a connecting procedure method in Bluetooth low energy technology to which the present disclosure is applicable.

A server transmits an advertising message to a client through three advertising channels, in S5010.

The server may be called an advertiser before connection and called as a master after the connection. As an example of the server, there may be a sensor (temperature sensor, etc.).

The server may also be called a scanner before the connection and called as a slave after the connection. As an example of the client, there may be a smartphone, etc.

As described above, in Bluetooth, communication is dividedly performed on a total of 40 channels through the 2.4 GHz band. Three channels among the 40 channels are the advertising channels and are used for exchanging packets that are sent and received for establishing the connection, as well as various advertising packets.

The remaining 37 channels are used for data exchange after connection to the data channel.

After the client receives the advertising message, the client may transmit a Scan Request message to the server in order to acquire additional data (e.g., a server device name, etc.).

In this case, the server transmits, to the client, a Scan Response message including the additional data as a response to the Scan Request message.

Here, the Scan Request message and the Scan Response message are one type of advertising packet, and the advertising packet may include only user data of 31 bytes or less.

Therefore, when there is data in which a size of the data is larger than 3 bytes, but overhead is large when transmitting the data after establishing the connection, the data is divided and sent twice using the Scan Request message/Scan Response message.

Next, the client transmits, to the server, a Connection Request message for Bluetooth connection configuration with the server, in S5020.

Through this, a link layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 to Phase 3.

Specifically, a pairing procedure (Phase 1) is performed between the server and the client, in S5030.

In the pairing procedure, the client transmits a Pairing Request message to the server, and the server transmits a Pairing Response message to the client.

Through the pairing procedure, authentication requirements, input (I)/output (O) capabilities, and key size information are transmitted and received between devices. Based on the information, which key generation method is to be used in Phase 2 is determined.

Next, as Phase 2, legacy pairing or secure connections are performed between the server and the client, in S5040.

In Phase 2, a 128-bit temporary key and a 128-bit short term key (STK) for performing the legacy pairing are generated.

Temporary Key: Key made for generating the STK
    Short Term Key (STK): Key value used for making encrypted connection between the devices If the secure connection is performed in Phase 2, a 128-bit long term key (LTK) is generated.

Long Term Key (LTK): Key value used even in later connection as well as encrypted connection between the devices Next, as Phase 3, a key distribution procedure is performed between the server and the client, in S5050.

Through this, the secure connection may be established between the server and the client, and data may be transmitted and received by establishing an encrypted link.

General of Isochronous Channel

With respect to an audio signal, audio streaming data or audio data may be periodically generated at an idle event interval.

The audio data is generated periodically (or at a specific time interval) based on characteristics thereof. The specific time interval at which the audio data is periodically generated may be expressed as the idle event interval. Each audio data is transmitted at each idle event interval. Further, each audio data may be transmitted in an entire duration or a partial duration of the idle event interval. When the audio streaming data generated periodically or regularly is transmitted using a BLE mechanism, an advertising and scanning procedure, a communication procedure, a disconnection procedure, etc. should be performed each time the generated audio data is transmitted/received. However, the audio data is generally periodically generated, and latency guarantee for audio data transmission is required regardless of an amount of the audio data.

However, when the advertising and scanning procedure, the communication procedure, the disconnection procedure, etc. should be performed each time newly generated audio data is transmitted, there is a problem in that latency occurs in audio data transmission.

Because the audio data transmission through hearing aids (HA) or headset, etc. has a comparatively small amount of data generated, it can obtain higher energy efficiency when using the BLE technology rather than the Bluetooth BR/EDR technology. However, as described above, because a data channel process of the BLE technology should perform advertising, connection, etc., every data transmission, the data transmission has large overhead, and in particular, latency guarantee absolutely required for the audio data transmission cannot be guaranteed.

Further, since the data channel process of the BLE technology transmits isolatedly generated data only as necessary, and has a purpose of increasing energy efficiency by inducing a deep sleep of the BLE device in other time domains. Therefore, it may be difficult to apply the data channel process of the BLE technology to transmission of periodically generated audio data.

Definition of Isochronous Channel and Mechanism Related Thereto

A new channel, i.e., an isochronous channel is defined to transmit periodically generated data using the BLE technology.

The isochronous channel is a channel used for transmitting isochronous data between devices (e.g., conductor-member) using an isochronous stream.

The isochronous data refers to data transmitted at a specific time interval, i.e., periodically or regularly.

That is, the isochronous channel may represent a channel in which the periodically generated data such as audio data or voice data is transmitted/received in the BLE technology.

The isochronous channel may be used for transmitting/receiving the audio data to/from a single member, a set of one or more coordinated members, or multiple members.

Further, the isochronous channel corresponds to a flushing channel which may be used for transmitting/receiving key data in an isochronous stream such as an audio streaming or other time domains.

When using a content of a game using Bluetooth low energy, a slave device which is a game controller and a master device which is a game machine body are connected. In this instance, a user input that is input to the slave device may be delivered to the master device depending on a connection method of the slave device and the master device, and an input delay which is a time required for processing the user input in the master device may occur.

When the slave device which is the game controller and the master device which is the game machine body are connected wiredly, a delay or jitter by the connection method may be close to 0 ms. Therefore, most of an input delay when the connection between the slave device and the master device is a wired connection may be a delay by software (SW) processing.

On the other hand, when the slave device which is the game controller and the master device which is the game machine body are connected wirelessly, a delay by a wireless connection method may occur, so a delay and jitter by the connection method may occur. In particular, in a wireless connection by a Bluetooth BR/EDR standard scheme, a delay and jitter may occur due to a 12.5 ms polling scheme which is a standard recommendation specification. Further, when multiple slave devices are connected to one master device, change widths of the delay and the jitter may further increase by an Async wireless connection scheme.

Data transmission/reception is available based on a sub event which is a smaller unit than a slot (625 us), which is a BR/EDR basic time unit, through an LE isochronous channel designed for audio transmission in which isochronism of data transmission is guaranteed, and the isochronism is guaranteed. Therefore, poll transmission of the master device is not required unlike the BR/EDR scheme.

The present disclosure proposes a method for transmitting a data traffic of the slave device, which is the game controller, on an LE isochronous channel. More specifically, the method proposed by the present disclosure relates to a method for guaranteeing the connection between multiple slave devices and the master device which is (i) within 1-ms delay and (ii) without jitter variation.

FIG. 6 illustrates an example of a data transmission/reception method in a BR/EDR scheme for helping understanding of a method described in the present disclosure. More specifically, FIG. 6 illustrates a BR/EDR data transmission/reception time duration from a master device perspective. The time duration may be a slot. In the BR/EDR, lengths of one transmission (Tx) slot and one reception (Rx) slot use a fixed time length of 625 us. In FIG. 6, reference numeral 610 denotes a time duration in which the master device transmits data to the slave device, and reference numeral 620 denotes a time duration in which the master device receives data from the slave device.

FIG. 7 illustrates another example of a data transmission/reception method in a BR/EDR scheme for helping understanding of a method described in the present disclosure. In FIG. 7, reference numeral 710 denotes a time duration in which the master device transmits data to the slave device, and reference numeral 720 denotes a time duration in which the master device receives data from the slave device. In FIG. 7, a length of one Tx/Rx slot is fixed to 625 us, and data transmission of each of the master device/the slave device is performed in a time division multiplexing (TDM) scheme. In this case, the data transmission of each of the master device/the slave device may be performed during time durations of 1, 3, and 5-slot sizes. Further, the data transmission of the master device to the slave device may be performed in even slots, and data reception of the master device from the slave device may be performed in odd slots. Referring to the reference numeral 710 of FIG. 7, for example, the data transmission of the master device to the slave device may be performed during time durations of 1-slot size and 5-slot size. Further, referring to the reference numeral 720 of FIG. 7, for example, the data reception of the master device from the slave device may be performed during time durations of 1-slot size and 3-slot size.

FIG. 8 illustrates an example of a data packet format for data transmission/reception in a BR/EDR scheme for helping understanding of a method described in the present disclosure. Referring to FIG. 8, it can be seen that a data packet format in the BR/EDR scheme is configured to include an ACCESS CODE field, a HEADER field, and a PAYLOAD field.

FIG. 9 illustrates another example of a data transmission/reception method in a BR/EDR scheme for helping understanding of a method described in the present disclosure. More specifically, FIG. 9 illustrates an example of a data transmission/reception method of the BR/EDR scheme based on a Synchronous Connection Oriented (SCO) link. For the data transmission/reception of the BR/EDR scheme based on the SCO link, HV1(⅓ FEC), HV2(⅔ FEC), and HV3(No FEC) packets may be used. SCO logical transport in the data transmission/reception of the BR/EDR scheme based on the SCO link may be transmission between symmetric points between the master device and the slave device. The data transmission/reception based on the SCO link may be preferably used for voice communication.

FIG. 10 illustrates another example of a data transmission/reception method in a BR/EDR scheme for helping understanding of a method described in the present disclosure. More specifically, FIG. 10 illustrates an example of a data transmission/reception method of the BR/EDR scheme based on an Asynchronous Connection-Less (ACL) link. For the data transmission/reception method of the BR/EDR scheme based on the ACL link, the master device may exchange a data packet with all the slave devices per slot in a non-reserved slot for the SCO logical transport. A packet exchange connection between (i) the master slave and (ii) all active slaves participating in a piconet may be provided based on the ACL logical transport. Further, both asynchronous and isochronous services may be supported based on the ACL link. Only a single ACL logical transport has to exist between two devices transmitting and receiving data based on the ACL link. Packet retransmission may be applied to the ACK packet in order to guarantee data integrity.

FIG. 11 illustrates another example of a data transmission/reception method in a BR/EDR scheme for helping understanding of a method described in the present disclosure. In the data transmission/reception in the BR/EDR scheme, since an asynchronous channel is used for data transmission of the slave device which is the game controller, it is difficult to guarantee that a controller of the slave device transmits data depending on a polling cycle decided by a host of the slave device.

In FIG. 11, reference numerals 1110 to 1150 denote examples where the polling cycles are 1.25 ms, 2.5 ms, 5 ms, 10 ms, and 12.5 ms, respectively. Since a minimum slot length of the BR/EDR is 625 us, a sum of lengths of slots for transmitting a poll and data may be at least 625 us×2=1.25 ms. When the poll and the data are transmitted based on a minimum cycle of 1.25 ms, the master device may transmit data 800 times per second. However, in the asynchronous transmission method, even if a transmission cycle is fixed at the host, the data is transmitted by a best effort method in the controller, so it is difficult to transmit the data at a regular time interval in an air interface. That is, referring to the reference numeral 1110 of FIG. 11, the pole and the data are configured to be transmitted at a cycle of 1.25 ms, but a time space in which the poll and the data are not transmitted is generated, and as a result, a jitter variation occurs. Referring to the reference numerals 1120 to 1150 of FIG. 11, it may be confirmed that the pole and the data may be transmitted at cycles of 2.5 ms, 5 ms, 10 ms, and 12.5 ms in order to use other traffic, but the examples of the reference numerals 1120 to 1150 of FIG. 11 have the same problem as the example of the reference numeral 1110.

FIG. 12 illustrates an example of using a game content using Bluetooth low energy for helping understanding of a method described in the present disclosure.

1210: Referring to FIG. 12, the slave device which is the game controller is wiredly or wirelessly connected to the master device which is the game machine body. Here, the master device may be a machine such as a PC or a game machine. When the slave device is wiredly connected to the master device, the two devices may be connected by a USB method and may follow a poll/data transmission method according to a USB HID standard. A polling cycle of the wired USB method may be set to 2 ms, 5 ms, and 10 ms from at least 1 ms. When the slave device is wirelessly connected to the master device, the two devices may be connected by a Bluetooth method and may follow a poll/data transmission method according to the Bluetooth HID standard. A polling cycle of the Bluetooth method may be set to 2.5 ms, 5 ms, 10 ms, and 12.5 ms from at least 1.25 ms.

1220: An input lag for the slave device which is the game controller may be determined based on (i) sensing delay and (ii) polling delay which are hardware elements, and (i) OS delay and (ii) game app delay which are software elements. Here, the sensing delay refers to a time it takes for the slave device which is a microcontroller (MC) to recognize a user input value that is input to the slave device. Further, the polling delay refers to a time it takes for user input data to be transmitted from the slave device to the master device through the USB or Bluetooth. Further, the OS delay refers to a time it takes for a PC or game machine OS to read a controller reception buffer value, and the game app delay refers to a time it takes for the game SW to read OS data.

1230: Referring to reference numeral 1230 of FIG. 12, it can be seen that in a wireless Bluetooth method, the polling delay exerts a largest influence on the input delay. FIG. 13 illustrates an example of a protocol stack to which a method described in the present disclosure is applicable. Referring to FIG. 13, a protocol stack to which the method described in the present disclosure is applicable may include a physical transport(s), a physical channel(s), a physical link(s), a logical transport(s), and a logical link(s). In the present disclosure, the physical channel may mean a synchronized Bluetooth baseband-compliant RF hopping sequence.

The piconet may mean a set of Bluetooth devices sharing the same physical channel defined by the master parameters (clock and BD_ADDR).

The physical link may be a baseband level link between two devices configured using paging. The physical link may include a transmission slot sequence of a physical channel alternating between a transmission slot of the master device and a transmission slot of the slave device.

Further, an LE isochronous physical channel may have a pseudo-random sequence of the PHY channel, and three additional parameters provided by a master or non-link type broadcaster as a feature. A first parameter may be a channel map representing a PHY channel set, and a second parameter may be a pseudo random number used as an index for all sets of the PHY channel. A third parameter may be a timing of a first data packet. A timing of a first packet of CIS may be provided to a link layer message transmitted in an ACL link linked by the master in a CIS setting step. A timing of a first packet of BIS may be referenced in a periodic advertising event related to the BIS.

FIG. 14 illustrates an example of a data packet format capable of being used in a protocol stack to which a method described in the present disclosure is applicable. Referring to FIG. 14, a data packet format capable of being used in a protocol stack to which a method described in the present disclosure is applicable includes a preamble field, an access address field, a PDU header field, a PDU payload field, MIC, and a CRC field. The uses of the respective fields are illustrated in FIG. 14.

FIG. 15 illustrates an example of a data transmission/reception method to which a method described in the present disclosure is applicable. More specifically, FIG. 15 is a diagram related to a data transmission method through the LE isochronous channel. FIG. 15(a) is related to data transmission of a unicast scheme through a connected isochronous channel (CIS), and FIG. 15(b) is related to data transmission of a broadcast scheme through a broadcast isochronous channel (BIS).

The LE isochronous channel is a channel that guarantees isochronism, and it may be guaranteed that a controller of the Bluetooth device transmits data according to a polling cycle set by a host of the Bluetooth device through the LE isochronous channel. sub_interval similar to the slot defined in the BR/EDR scheme may be used in the LE isochronous channel.

sub_interval of a unicast channel based on the CIS may have a length of at least 400 us and may be adjusted in units of 30 us. sub_interval of a broadcast channel based on the BIS may have a length of at least 300 us and may be adjusted in units of 30 us.

ISO_interval may be set to a length longer than sub_interval for managing a transmission buffer. When a time as long as the ISO_interval elapsed, the transmission buffer may be flushed, and new data may be transmitted.

In the data transmission of the unicast scheme, bidirectional communication between the master device and the slave device may be performed using the connected isochronous channel (CIS). In the CIS, a connected device may transmit isochronous data even in any direction. The size of the data may be fixed or variable, and there may be a frame or no frame. The isochronous data may be transmitted in an LE-S or LE-F logical link by using the CIS logical transport. Each CIS should be connected to the ACL. In the CIS, since (i) transmission of packets having various sizes and (ii) transmission of one or more packets in each isochronous event are supported, various data rates may be supported. Data traffic may be transmitted/received between the devices unidirectionally or bidirectionally. In the CIS, an acknowledgment protocol for enhancing reliability of packet delivery may be defined.

In the data transmission of the broadcast method, unidirectional communication between the master device and the slave device may be performed by using the broadcast isochronous channel (BIS). That is, referring to FIG. 15(b), in the data transmission of the broadcast method, data may be broadcasted only in (i) a direction from the slave device to the master device or (ii) a direction from the master device to the slave device. The BIS is a logical transport which allows the device to transmit the isochronous data. The isochronous data may have a frame or no frame. In the BIS, since (i) transmission of packets having various sizes and (ii) transmission of one or more packets in each isochronous event are supported, various data rates may be supported. The data traffic may be performed unidirectionally in the broadcasting device. As a result, in the BIS, the acknowledgment protocol is not defined, and it is difficult to intrinsically guarantee the reliability of broadcast isochronous traffic. The BIS may support multi-retransmission in order to enhance the reliability of the packet delivery.

In the LE isochronous channel, the isochronism of data transmission/reception is guaranteed, and the master device and the slave device share timing for data transmission/reception. Therefore, a master poll required for timing synchronization for the data transmission/reception between the master device and the slave device in the asynchronous channel does not need to be transmitted to the slave device.

FIG. 16 illustrates an example on which a method described in the present disclosure is performed.

S1610: First, the master device and the slave device may discover each other and form the connection.

S1620: Next, the master device and the slave device may form a connection for isochronous data transmission. In this case, the connection for isochronous data transmission may be unicast CIS.

S1630: Next, when there is input data of the user (e.g., a controller button input, a joystick input, etc.), the slave device which is a game controller may transmit data to the master device based on a notification method in a slave data transmission duration. In this case, since a controller of the slave device knows a slave data transmission timing, the master device may not transmit a poll to the slave device. Therefore, when there is input data of the user, the slave device may transmit the input data to the master device without the poll reception from the master device. On the contrary, when there is no input data of the user, the slave device may not perform data transmission to the master device in the slave data transmission duration without the poll reception from the master device. Through this method, there is an effect that the slave device does not need to manage an Rx buffer for receiving data (poll) from the master device. Further, there is an effect that the master device does not need to manage a timeout for reception of data that the slave device transmits to the master device within any sub_interval after the poll transmission.

FIG. 17 illustrates an example of isochronous data transmission of a slave device. More specifically, FIG. 17 illustrates an example of an operation in which a user input is input to one slave device, and isochronous data for the input user input is transmitted on the LE isochronous channel by the slave device. In FIG. 17, reference numeral 1710 denotes an operation in which the input data of the user is input to the slave device, and reference numeral 1720 denotes an operation in which the slave device transmits the input data on the LE isochronous channel. In FIG. 17, transmission of the isochronous data on the LE isochronous channel is performed based on a periodically allocated transmission duration. The transmission duration includes (i) a transmission duration (a first transmission duration) 1721 for data transmission from the master device to the slave device, and ii) a transmission duration (a second transmission duration) 1722 for data transmission from the slave device to the master device.

Referring to FIG. 17, when there is input data of the user in the transmission duration, the slave device performs transmission of isochronous data for the input data in a transmission duration receiving the input data. On the contrary, when there is no input data of the user in the transmission duration, the slave device omits transmission of isochronous data for the input data in a transmission duration receiving the input data.

Hereinafter, an example where a plurality of slave devices is connected to the master device to transmit the isochronous data will be described with reference to FIGS. 18 and 19.

Embodiment 1

This embodiment relates to a method in which when there are two or more slave devices that are a game controller, data transmission durations of the slave devices are crossingly used between the slave devices. In the present embodiment, transmission durations configured for a master device and each of the slave devices connected to the master device may have the same form.

FIG. 18 illustrates an example of a method of transmitting isochronous data of a slave device described in the present disclosure. More specifically, FIG. 18 illustrates an example in which two slave devices 120 transmit isochronous data to a master device 110. In FIG. 18, the two slave devices may crossingly use transmission durations of the slave devices. Reference numeral 1810 of FIG. 18 shows a form in which data is sent from a bearer of each slave device side to controller Tx queues of the slave devices. For such an operation, the master device may be in a state of forming a unicast connection with all the slave devices in order to share a transmission timing with the slave devices. In FIG. 18, control signals (isochronous data) of the slave devices may be transmitted based on multi-MAC. Reference numeral 1820 of FIG. 18 shows a form in which data is received from a bearer to a controller Rx queue of the master side. For convenience of description, FIG. 18 illustrates an example in which two slave devices are connected to the master device, by way of example, but the present disclosure is not limited thereto. The contents described above can be equally/similarly applied even when more than two slave devices are connected to the master device.

In the present embodiment, (i) a percentage occupied by a transmission duration (first transmission duration), in which the master device transmits data to the slave device, with respect to the entire transmission duration and (ii) a percentage occupied by a transmission duration (second transmission duration), in which the slave device transmits data to the master device, with respect to the entire transmission duration are equally set. Here, the first transmission duration may be understood as a time duration that is configured so that the slave device receives data from the master device (expects to receive data). Further, since there are two or more slave devices that transmit the isochronous data to the master device, it may be understood that a different transmission duration is allocated to each of the slave devices connected to the master device. The number of different transmission durations may be equal to the number of slave devices connected to the master device.

Additionally, the slave device may receive, from the master device, information (transmission duration allocation scheme information) on a scheme in which the different transmission durations are allocated to the slave devices connected to the master device. Each transmission duration in which the slave devices connected to the master device transmit the isochronous data may be determined based on the transmission duration allocation scheme information.

Further, since a different transmission duration is allocated to each of the plurality of slave devices connected to the master device, a specific time duration including the different transmission durations may be configured so that each of the plurality of slave devices can have a data transmission opportunity once. In this case, the specific time duration may be understood as being periodically repeated. Further, a scheme in which the different transmission durations are allocated to the plurality of slave devices within the specific time duration may be configured to be always the same. That is, the scheme in which the different transmission durations are allocated to the plurality of slave devices within the specific time duration may be configured to be the same every specific time duration. As another embodiment, the scheme in which the different transmission durations are allocated to the plurality of slave devices within the specific time duration may be updated according to a predetermined interval. For example, the scheme in which the different transmission durations are allocated to the plurality of slave devices within the specific time duration may be changed every specific time duration. In this case, the time duration allocation scheme changed according to the update may be randomly determined. For example, when four slave devices are connected to the master device, a time duration allocation scheme within a specific time duration for the slave devices may be updated every predetermined cycle as in (1-2-3-4)→(2-1-4-3)→(3-4-2-1). When the scheme in which the different transmission durations are allocated to the plurality of slave devices within the specific time duration is changed at a predetermined cycle, there is an effect that an equity between users participating in a game can be guaranteed.

Embodiment 2

This embodiment relates to a method in which a transmission duration configured in a master device is the same as the embodiment 1, and transmission durations configured for slave devices connected to the master device are defined in different types.

FIG. 19 illustrates another example of a method of transmitting isochronous data of a slave device described in the present disclosure. More specifically, FIG. 18 illustrates an example in which two slave devices 120 transmit isochronous data to a master device 110. In FIG. 19, two slave devices transmit the isochronous data in the same transmission duration, and the transmission durations configured for the two slave devices may be defined as different forms. More specifically, in FIG. 19, reference numeral 1910 denotes a transmission duration configured in the master device, reference numeral 1920 denotes a transmission duration configured in one slave device of the two slave devices, and reference numeral 1930 denotes a transmission duration configured in the other slave device. The transmission durations are configured as illustrated in FIG. 19, and as a result, even if several slave devices are used, transmission of all the slave devices can be performed within one transmission duration, thereby obtaining an effect that the delay can be reduced. That is, the master device can receive the isochronous data from all the slave devices within one sub-event.

In the present embodiment, with respect to the slave device, (i) a percentage occupied by a transmission duration (first transmission duration), in which the slave device receives data from the master device, with respect to an entire transmission duration of the slave device and (ii) a percentage occupied by a transmission duration (second transmission duration), in which the slave device transmits data to the master device, with respect to the entire transmission duration may be differently set. Further, (i) the percentage occupied by the first transmission duration with respect to the entire transmission duration may be greater than (ii) the percentage occupied by the second transmission duration with respect to the entire transmission duration.

When the plurality of slave devices transmit the isochronous data to the master device in accordance with the present embodiment, the isochronous data transmission of each of the plurality of slave devices may be performed in one transmission duration. In this case, a ratio between (i) the first transmission duration and (ii) the second transmission duration may be set to a different value for each of the plurality of slave devices.

Additionally, each of the plurality of slave devices may receive, from the master device, information on the ratio between (i) the first transmission duration and (ii) the second transmission duration.

In the present embodiment, with respect to the master device, (i) a percentage occupied by a transmission duration, in which the master device transmits data to the slave device, with respect to an entire transmission duration and (ii) a percentage occupied by a transmission duration, in which the master device receives data from the slave device, with respect to the entire transmission duration may be equally set. In this case, at least one isochronous data transmitted by each of the plurality of slave devices may be received in a transmission duration, configured in the master device, in which the master device receives data from the slave device.

When it is considered that a minimum polling interval of a wired controller is 1 ms, if an LE isochronous channel is used based on the method described in the present disclosure, an earlier polling interval than the wired controller may be secured. Further, since a sub-event of the LE isochronous channel can be controlled in units of 30 us, an average delay may be calculated by controlling the polling interval according to game requirements. Since the LE isochronous channel can always expect data to be transmitted at a constant time unlike the asynchronous channel of the BR/EDR, a jitter variation amount can be reduced compared to the existing BR/EDR.

According to the method described in the present disclosure, since the master device may not send the poll to the slave device, and different data may be transmitted in the transmission duration of the master device, data transmission efficiency can be enhanced twice compared to the existing BR/EDR method. Additionally, even if the plurality of slave devices are used, the delay is not increased, but the delay may be maintained the same as when only one slave device is used.

FIG. 20 illustrates an example of a method of transmitting audio data using a short-range wireless communication technology. More specifically, FIG. 20 illustrates a method of transmitting audio data based on Bluetooth BR/EDR. Referring to FIG. 20, transmission of the audio data based on the Bluetooth BR/EDR may be performed based on a DH5 scheme in which (1) five audio data (2001) is transmitted from the master device to the slave device, and (2) ACK (2003) is transmitted from the slave device to the master device.

The transmission of the audio data based on the Bluetooth BR/EDR has a problem that no specific criterion exists regarding how to set a length (100 ms, 500 ms, 1 sec) of an entire bandwidth (BW) duration for buffer management of the master device/the slave device. The transmission of the audio data based on the Bluetooth BR/EDR also has a problem that the audio data is performed based on the DH5 scheme of an asynchronous channel, but it cannot be accurately predicted how DH5 consisting of five audio data and ACK will be deployed in an actual air interface. That is, a controller of the master device receives a command of a host and asynchronously sends a packet based on a channel situation and a buffer situation. In this case, all the DH5 may be transmitted consecutively (contiguously) as illustrated in (a) of FIG. 20, may be transmitted at irregular intervals depending on buffer spare as illustrated in (b) of FIG. 20, and may be transmitted at equal intervals (periodically) as illustrated in (c) of FIG. 20. The audio data transmission method illustrated in (c) of FIG. 20 may be similar to an isochronous data transmission method in a Bluetooth LE isochronous channel.

FIG. 21 illustrates another example of a method of transmitting audio data using a short-range wireless communication technology. More specifically, FIG. 21 illustrates a method in which audio data transmission and poll/data transmission/reception based on Bluetooth BR/EDR are performed together. FIG. 21 illustrates an example of audio data transmission and poll/data transmission/reception in a picont consisting of one master device and two slave devices. Here, the two slave devices may be a controller and a headset, respectively. In order to support DH5, that is an audio data packet, in a picont controlled by one master device, a joystick/controller polling period has to be greater than or equal to 5 ms. That is, since a sum of the time (625 us*2) it takes for the master device to transmit the poll to the slave device, that is a joystick/controller, and to receive control data, and the time (625 us*6) it takes for the master device to transmit five audio data to the slave device and to receive ACK therefor equals 5 ms, the joystick/controller polling period may need to be greater than or equal to 5 ms. However, because the audio data packet is transmitted using the asynchronous channel, an exact transmission time of the DH5 packet cannot be predicted. Thus, a buffer length needs to be set large, and hence, there occurs a delay time of the control data that the slave device that is the joystick/controller transmits to the master device.

When SBC 1 channel that is BR/EDR standard codec is 4096-byte sampled and is compressed by ¼, a size of an audio data packet is 1024 bytes. Since a maximum size of DH5 is 226 bytes, five DH5 packets may be required per one channel (226*5=1130>1024). According to A2DP that is audio data transmission profile standard, two left and right channels may be transmitted to one joint stereo, and a 20-30% coding gain can be obtained compared to L/R stereo. About eight DH5 packets are required to transmit one sample of L/R stereo, but the transmission arrangement of the eight DH5 packets cannot be accurately predicted. Therefore, the buffer length may need to be set sufficiently large. AVDTP that is audio transmission protocol standard uses RTP, and FEC mechanism is used to guarantee QoS of packet transmission.

FIG. 22 illustrates an example where a method of transmitting audio data described in the present disclosure is performed.

More specifically, (a) of FIG. 22 illustrates an example of audio data transmission based on Bluetooth BR/EDR. In (a) of FIG. 22, one master device and four slave devices constitute one piconet. Here, the master device transmits audio data to two slave devices of the four slave devices and receives data generated based on a user input from the remaining two slave devices. The two slave devices to which the master device transmits the audio data may be headsets, and the two slave devices from which the master device receives the data generated based on the user input may be game controllers. The audio data transmission and the reception of the data generated based on the user input may be performed in a unicast scheme. Referring to reference numeral 2211 of FIG. 22(a), the master device transmits the audio data in the unicast scheme and receives the data generated based on the user input in the unicast scheme, and thus a bandwidth (BW) may be insufficient, and data packet intervals between the audio data and the data generated based on the user input may be irregular.

(b) of FIG. 22 illustrates an example of audio data transmission based on a Bluetooth LE isochronous channel described in the present disclosure. In (b) of FIG. 22, one master device and four slave devices constitute one piconet. Here, the master device transmits audio data to two slave devices of the four slave devices and receives data generated based on a user input from the remaining two slave devices. The two slave devices to which the master device transmits the audio data may be headsets, and the two slave devices from which the master device receives the data generated based on the user input may be game controllers. The audio data transmission may be performed in a broadcast scheme, and the reception of the data generated based on the user input may be performed in a unicast scheme. In FIG. 22(b), the master device transmits the audio data in the broadcast scheme and receives the data generated based on the user input in the unicast scheme, and thus data packet intervals between the audio data and the data generated based on the user input can be regular, and latency can be reduced. In addition, referring to reference numeral 2221 of FIG. 22(b), a bandwidth (BW) can be efficiently used, and thus a spare bandwidth can exist.

FIG. 23 illustrates an example for helping understanding of a method of transmitting audio data described in the present disclosure. More specifically, FIG. 23 illustrates a method in which a master device (i) transmits audio data and (ii) receives control data from a slave device based on Bluetooth BR/EDR. In FIG. 23, one master device and four slave devices constitute one piconet. Here, the master device transmits audio data to two slave devices of the four slave devices and receives control data generated based on a user input from the remaining two slave devices. Both the audio data and the control data may be transmitted and received based on a unicast scheme.

Referring to FIG. 23, p1 denotes a poll for indicating a transmission timing of control data c1 of joy1 that is the slave device, and p2 denotes a poll for indicating a transmission timing of control data c2 of joy2 that is the slave device. The slave device joy1 receiving the p1 may transmit, to the master device, the control data c1 generated based on the user input as a response to the p1 based on a unicast scheme. Further, the slave device joy2 receiving the p2 may transmit, to the master device, the control data c2 generated based on the user input as a response to the p2 based on the unicast scheme.

In FIG. 23, LR denotes audio data transmitted to slave devices Headset 1 and Headset 2. Referring to p1 and p2 transmission timings of the master device of FIG. 23, a sufficient buffer time for transmitting the audio data may be configured between the p1 and the p2. Referring to reference numeral 2310 of FIG. 23, according to the audio data transmission and control data reception method in FIG. 23, a BW may be insufficient due to the buffer time, and a situation in which the slave device Headset 2 cannot receive the audio data may occur.

FIG. 24 illustrates another example where a method of transmitting audio data described in the present disclosure is performed. In FIG. 24, one master device and four slave devices constitute one piconet. Here, the master device transmits audio data to two slave devices Headset1 and Headset2 of the four slave devices and receives data generated based on a user input from the remaining two slave devices Joy1 and Joy2. The two slave devices to which the master device transmits the audio data may be headsets, and the two slave devices from which the master device receives the data generated based on the user input may be game controllers. The audio data transmission may be performed in a broadcast scheme, and the reception of the data generated based on the user input may be performed in a unicast scheme. In FIG. 24, the master device transmits the audio data in the broadcast scheme and receives the data generated based on the user input in the unicast scheme, and thus data packet intervals between the audio data and the data generated based on the user input can be regular, and latency can be reduced.

Referring to reference numeral 2420 of FIG. 24, the master device may transmit the audio data to at least one first slave device Headset1 and Headset2 based on the broadcast scheme. Referring to reference numeral 2430 of FIG. 24, the master device may receive the data generated based on the user input from at least one second slave device Joy1 and Joy2 based on the unicast scheme. In this instance, (i) a transmission of the audio data and (ii) a reception of the data generated based on the user input may be performed based on at least one time duration periodically allocated for (i) the transmission of the audio data and (ii) the reception of the data generated based on the user input, illustrated in reference numeral 2223 of (b) of FIG. 22. Each of the at least one time duration may include (i) a first time duration (2223-1 of (b) of FIG. 22) for the transmission of the audio data and (ii) a second time duration (2223-2 of (b) of FIG. 22) for the reception of the data generated based on the user input.

Referring again to the reference numeral 2420 of FIG. 24, the master device may divide the audio data based on a time length of the at least one time duration to generate at least one sub-audio data. In this instance, the at least one sub-audio data may be transmitted in the same specific number of time durations as the number of the at least one sub-audio data among the at least one time duration. That is, each of the at least one sub-audio data may be transmitted in one time duration among the specific number of time durations.

The specific number of time durations in which each of the at least one sub-audio data is transmitted may be contiguously assigned in a time domain, as illustrated in the reference numeral 2223 of (b) of FIG. 22. That is, referring to (b) of FIG. 22, at least one sub-audio data (LR) may be transmitted in contiguous time durations (12/34/56/78), respectively. In this instance, each of the at least one sub-audio data may be transmitted in the first time duration (2223-1 of (b) of FIG. 22) of the one time duration, and the data of the slave device generated based on the user input may be transmitted in the second time duration (2223-2 of (b) of FIG. 22) of the one time duration. The first time duration may be configured such that a time duration in which the master device transmits the poll to the slave device is used in the audio data transmission based on the broadcast scheme in the existing Bluetooth BR/EDR method.

Referring to the reference numeral 2221 of (b) of FIG. 22, (i) after all the sub-audio data is transmitted and (ii) before new audio data is generated, only data based on the user input may be transmitted in a time duration after the specific number of time durations among the at least one time duration. Each of the at least one time duration may be a unit of time at which frequency hopping is performed.

FIG. 25 is a flowchart illustrating an example where a method of transmitting audio data in a short-range wireless communication system described in the present disclosure is performed by a master device.

More specifically, the master device transmits the audio data to at least one first slave device based on a broadcast scheme, in S2510.

Afterward, the master device receives data generated based on a user input from at least one second slave device based on a unicast scheme, in S2520.

Here, (i) a transmission of the audio data and (ii) a reception of the data generated based on the user input are performed based on at least one time duration periodically allocated for (i) the transmission of the audio data and (ii) the reception of the data generated based on the user input, and each of the at least one time duration includes (i) a first time duration for the transmission of the audio data and (ii) a second time duration for the reception of the data generated based on the user input.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the above detailed description should not be construed as limiting in all aspects and should be considered as illustrative. The scope of the present disclosure should be determined by rational construing of the appended claims, and all modifications within an equivalent scope of the present disclosure are included in the scope of the present disclosure. Further, the present disclosure describes both the product invention and the method invention, and the description of both inventions can be supplementarily applied as needed.

INDUSTRIAL APPLICABILITY

The preferred embodiments of the present disclosure described above are disclosed for an exemplary purpose, and modifications, changes, substitutions, or additions of various other embodiments can be made by those skilled in the art within the technical spirit and the technical scope of the present disclosure described in the appended claims below.

What is claimed is:

1. A method of transmitting, by a master device, audio data in a short-range wireless communication system, the method comprising:
    transmitting, to at least one first slave device, the audio data based on a broadcast scheme; and
    receiving, from at least one second slave device, data generated based on a user input based on a unicast scheme,
    wherein (i) a transmission of the audio data and (ii) a reception of the data generated based on the user input are performed based on at least one time duration periodically allocated for (i) the transmission of the audio data and (ii) the reception of the data generated based on the user input, and
    wherein each of the at least one time duration includes (i) a first time duration for the transmission of the audio data and (ii) a second time duration for the reception of the data generated based on the user input.

2. The method of claim 1, further comprising:
    dividing the audio data based on a time length of the at least one time duration to generate at least one sub-audio data,
    wherein the at least one sub-audio data is transmitted in the same specific number of time durations as a number of the at least one sub-audio data among the at least one time duration.

3. The method of claim 2, wherein each of the at least one sub-audio data is transmitted in one time duration among the specific number of time durations.

4. The method of claim 3, wherein the specific number of time durations are contiguous in a time domain.

5. The method of claim 3, wherein each of the at least one sub-audio data is transmitted in the first time duration of the one time duration.

6. The method of claim 5, wherein the data generated based on the user input is transmitted in the second time duration of the one time duration.

7. The method of claim 6, wherein the first time duration is located earlier in time than the second time duration within the one time duration.

8. The method of claim 3, wherein (i) after all the sub-audio data is transmitted and (ii) before new audio data is generated, only data based on the user input is transmitted in a time duration after the specific number of time durations among the at least one time duration.

9. The method of claim 1, wherein each of the at least one time duration is a unit of time at which a frequency hopping is performed.

10. The method of claim 1, wherein receiving the data generated based on the user input based on the unicast scheme comprises:
    forming a connection with each of the at least one second slave device in order to receive the data generated based on the user input from the at least one second slave device; and
    based on the formed connection, receiving, from each of the at least one second slave device, the data generated based on the user input.

11. The method of claim 10, wherein, based on there being no the user input in a specific time duration among the at least one time duration, the reception of the data generated based on the user input in the specific time duration is omitted.

12. The method of claim 11, wherein the reception of the data generated based on the user input from each of the at least one second slave device is performed in different time durations.

13. The method of claim 12, wherein a number of the different time durations is the same as a number of the at least one second slave device.

14. The method of claim 13, further comprising:
    transmitting, to the at least one second slave device, transmission duration allocation scheme information on a scheme in which the different time durations are respectively allocated to the at least one second slave device.

15. The method of claim 10, wherein a time duration in which each of the at least one second slave device transmits the data generated based on the user input is determined based on transmission duration allocation scheme information.

16. A master device transmitting audio data in a short-range wireless communication system, the master device comprising:
    a transmitter configured to transmit a radio signal;
    a receiver configured to receive the radio signal;
    at least one processor; and
    at least one computer memory operably connectable to the at least one processor,
    wherein the at least one computer memory is configured to store instructions that allow the at least one processor to perform operations based on being executed by the at least one processor,
    wherein the operations comprise:
    transmitting, to at least one first slave device, the audio data based on a broadcast scheme; and
    receiving, from at least one second slave device, data generated based on a user input based on a unicast scheme,
    wherein (i) a transmission of the audio data and (ii) a reception of the data generated based on the user input are performed based on at least one time duration periodically allocated for (i) the transmission of the audio data and (ii) the reception of the data generated based on the user input, and
    wherein each of the at least one time duration includes (i) a first time duration for the transmission of the audio data and (ii) a second time duration for the reception of the data generated based on the user input.

* * * * *